US012712838B1

(12) United States Patent
Bora et al.

(10) Patent No.: US 12,712,838 B1
(45) Date of Patent: Aug. 18, 2026

(54) APPARATUSES OR METHODS INVOLVING ASYNCHRONOUS VIDEO COMMUNICATION FOR COACHING WITHIN COMMUNICATIONS PLATFORM

(71) Applicant: 8x8, Inc., Campbell, CA (US)

(72) Inventors: Bianca Bora, Gilau Village (RO); Patrick Russell, Columbus, OH (US)

(73) Assignee: 8x8, Inc., Campbell, CA (US)

( * ) Notice: Subject to any disclaimer, the term of this patent is extended or adjusted under 35 U.S.C. 154(b) by 198 days.

(21) Appl. No.: 18/623,852

(22) Filed: Apr. 1, 2024

Related U.S. Application Data

(60) Provisional application No. 63/542,474, filed on Oct. 4, 2023.

(51) Int. Cl.
*G06F 15/173* (2006.01)
*H04L 51/04* (2022.01)
*H04L 51/216* (2022.01)

(52) U.S. Cl.
CPC ............ *H04L 51/216* (2022.05); *H04L 51/04* (2013.01)

(58) Field of Classification Search
CPC .............................. H04L 51/216; H04L 51/04
See application file for complete search history.

(56) References Cited

U.S. PATENT DOCUMENTS

| | | | |
|---|---|---|---|
| 5,473,732 | A | 12/1995 | Chang |
| 6,424,935 | B1 | 7/2002 | Taylor |
| 7,236,932 | B1 | 6/2007 | Grajski |
| 8,788,535 | B2 | 7/2014 | Bonev et al. |
| 10,142,329 | B1 | 11/2018 | Liu |
| 10,318,617 | B2 | 6/2019 | Gelfand et al. |

(Continued)

FOREIGN PATENT DOCUMENTS

| | | |
|---|---|---|
| WO | 2022/240433 A1 | 11/2022 |
| WO | 2022/256028 A1 | 12/2022 |

OTHER PUBLICATIONS

TheSandWraith: How to merge iOS messages conversation feed? Apple Inc., https://discussions.apple.com/thread/6566339, 4 pages (Sep. 27, 2014).

(Continued)

*Primary Examiner* — John B Walsh
(74) *Attorney, Agent, or Firm* — Vista IP Law Group, LLP

(57) ABSTRACT

Aspects of the present disclosure are directed to apparatuses, systems and methods involving data communications in a contact center. Data communications are routed/conveyed for a plurality of endpoint devices associated with contact center agents of a client entity, including data communications between both respective contact center agents and end users, and the respective contact center agents and a supervisory user. In response to the supervisory user selecting an association linked to the one or more of the data communications, the supervisory user is provided access live audio or video communications involving the selected association. Analytics data is generated and presented based on characteristics of the live data communications, and historical characteristics of data communications involving the selected association. Asynchronous communications involving one or more individuals designated on behalf of the client entity, including video communication data generated in response to the analytics data, are provided for delayed access.

18 Claims, 9 Drawing Sheets

(56) References Cited

U.S. PATENT DOCUMENTS 10,616,345 B1 4/2020 Quimette et al.
10,735,592 B1 8/2020 Liu et al.
10,939,179 B2 3/2021 Park et al.
10,949,619 B1 3/2021 Arsanjani et al.
10,994,800 B2 5/2021 Noguchi et al.
11,025,488 B1 6/2021 Arsanjani et al.
11,044,338 B1 6/2021 Arsanjani et al.
11,070,640 B1 7/2021 Arsanjani et al.
11,196,866 B1 12/2021 Samat et al.
11,425,252 B1 8/2022 Martin et al.
11,445,063 B1 9/2022 Driemeyer et al.
11,539,541 B1 12/2022 Driemeyer et al.
11,551,005 B1 1/2023 Arsanjani et al.
11,575,755 B1 2/2023 Arsanjani et al.
11,575,791 B1 2/2023 Arsanjani et al.
11,622,043 B1 4/2023 Samat et al.
2003/0055974 A1 3/2003 Brophy et al.
2004/0143559 A1 7/2004 Ayala
2008/0086564 A1 4/2008 Putman et al.
2009/0112875 A1 4/2009 Maes
2009/0276215 A1 11/2009 Hager
2010/0246800 A1 9/2010 Geppert et al.
2011/0046960 A1 2/2011 Spier et al.
2014/0100848 A1 4/2014 Shaffer et al.
2015/0326722 A1* 11/2015 Thomson .......... H04M 3/42221
379/265.07
2015/0350443 A1 12/2015 Kumar et al.
2016/0095056 A1 3/2016 Lebon-schneider et al.
2016/0227035 A1 8/2016 Kumar et al.
2016/0349960 A1 12/2016 Kumar et al.
2016/0358115 A1* 12/2016 Gustafson ........ G06Q 10/06395
2017/0006161 A9 1/2017 Riahi et al.
2018/0234550 A1 8/2018 Lifson et al.
2018/0315000 A1 11/2018 Kulkarni et al.
2019/0215249 A1 7/2019 Renard et al.
2020/0342850 A1 10/2020 Vishnoi et al.
2022/0308720 A1 9/2022 Korzhenevich et al.

OTHER PUBLICATIONS

Alex Heath. Merge Clears Up Confusion by Combining iMessages From Multiple Device IDs Right In iOS [JailbreakCon]. https//www.cultofmac.com/category/news/, 9 sheets (Sep. 29, 2012).

8X8, “8x8 Frontdesk”, https://www.8x8.com/products/business-phone/frontdesk?locale=us&utm_medium=paid-search&utm_source=google&utm_campaign=elite&utm_adgroup=Google_US_Search_Brand_Frontdesk|AAA_8x8_Frontdesk&utm_term=8x8%20front%20desk&type=Google_US_Search_Brand_Frontdesk&gclid=Cj0KCQiA4b2MBhD2ARIsAIrcB-RkZXOwVjVgTkcRcA_XSIAMzBFL5JJvV7M7xi9_fCrXSVOIZamU5OUaAii8EALw_wcB, downloaded Apr. 25, 2023.

8X8, “8x8 Work”, https://www.8x8.com/products, downloaded Apr. 25, 2023.

8X8, “8x8 Work”, https://www.8x8.com/products, downloaded Aug. 2023.

USPTO. Final Office Action dated Aug. 16, 2024, received for U.S Appl. No. 17/839,157 of the instant Applicant/Assignee.

USPTO. Office Action dated Jun. 25, 2024, received for Design U.S. Appl. No. 29/842,406 of the instant Applicant/Assignee.

* cited by examiner

APPARATUSES OR METHODS INVOLVING ASYNCHRONOUS VIDEO COMMUNICATION FOR COACHING WITHIN COMMUNICATIONS PLATFORM

CROSS-REFERENCE TO RELATED APPLICATIONS

Aspects of various embodiments are directed to apparatuses (e.g., systems, devices, etc.) and to methods such as those described in the claims, description or figures herein and in U.S. Provisional Patent Application Ser. No. 63/542,474 filed on Oct. 4, 2023, to which priority is claimed and which is fully incorporated herein by reference. For information regarding details of other embodiments, experiments and applications that can be combined in varying degrees with the teachings herein, reference may be made to the teachings in the above-mentioned Provisional Patent Application.

BACKGROUND

In certain contexts, computer-based data communications systems often include circuitry, such as Internet-communication-enabled circuitry and user interface platforms that function as contact centers. Such systems and particularly contact centers are important to the operations of many businesses as they serve as the primary interface between the business and its customers. For example, contact center agents are often responsible for answering customer inquiries, resolving issues, and providing customer support. Due to the high volume of customer interactions, it can be important for contact center agents to receive regular coaching and feedback to improve their performance.

Coaching (including training in many contexts) of agents has been done through scheduled meetings via in-person, video conference or phone calls. However, these methods can be time-consuming and may not be feasible for all situations, especially those who work remotely. With the advent of video conferencing technology, video coaching has become increasingly popular. However, live video coaching sessions can still be disruptive to agent work and may not be convenient for all parties involved. Existing data communication systems and methods are ill equipped to facilitate such interaction and related data communication and routing needs.

These and other aspects present challenges to the implementation and operation of communications circuitry and systems.

SUMMARY OF VARIOUS ASPECTS AND EXAMPLES

Various examples/embodiments presented by the present disclosure are directed to issues such as those addressed above and/or others which may become apparent from the following disclosure. For example, some of these disclosed aspects are directed to methods and devices that involve assessing and implementing asynchronous video communication, for example by storing and (later) routing video data. Such approaches may, for example, facilitate load balancing with respect to data communications on specific network channels as may involve utilization by contact center agents and interactions therewith. Other aspects are directed to overcoming previously-used techniques, such as discussed above, by facilitating asynchronous video communications and achieving related data communication, bandwidth, and scheduling conditions, including those amenable to facilitating coaching interaction. Certain aspects are related to assessing characteristics of data communication between contact center agents and end users (e.g., as may involve content, data communication channel selection and optimization, and subsequent results/conditions relating to the communication). This assessing and related recommendations/implementations of data communication controls and efforts may be facilitated utilizing via artificial intelligence (AI) and/or machine learning (ML), as characterized further herein.

Aspects of various embodiments are directed to apparatuses, systems, methods of use, methods of making, or materials, such as those described in the claims, description or figures herein, all of which form part of this patent document. For information regarding details of other embodiments, experiments and applications that can be combined in varying degrees with the teachings herein, reference may be made to the teachings and underlying references provided herein (e.g., as may involve the referenced AI/ML algorithms).

In certain exemplary contexts, aspects of the present disclosure are directed to asynchronous video communication to support coaching needs within a contact center operation, such as characterized above generally and as characterized herein below in connection with certain example aspects and embodiments of the present disclosure.

In connection with other specific exemplary contexts, aspects of the present disclosure are directed to a software-configured computer-and-communications system and method for providing asynchronous video communication to support coaching needs within a data-communications platform such as "8×8 Work" (a platform offered by the assignee of the present disclosure (8×8, Inc.) and available at www.8×8.com). As one example, this may be coaching tips for contact center operation (e.g., supervisors and agents). In certain contexts, this functionality is more broadly applicable to work with any type of feature or functionality across various products/services offered by the above-noted assignee.

In another example, such a system includes a server (e.g., a set of one or multiple cooperatively-configured servers) that communicates with one or more client devices via a network. The system allows for asynchronous video communication between a coach and a contact center agent, providing a more flexible and effective coaching experience for the coach and agent, and as may facilitate data management and bandwidth considerations relating to such communications. There may be also be other components or modules that can be created, trained and integrated to made this functionality customizable, extensible and scalable. For instance, components may be integrated with a data-processer computing circuitry, which may be configured to augment data from internal and/or external sources, to analyze such data and to use machine-language/artificial-intelligence engines (e.g., computer circuitry configured with ML/AI models and algorithms) to catalog, tag and classify recorded coaching tips, for future searching, generation and surfacing of data insights/suggestions, predictions of future outcomes based on similar data feeds (e.g., related to the internal/external data), etc.

In related examples according to the present disclosure, the system allows coaches (e.g., on behalf of one or more client entities registered to receive data communications services from a provider of data communications services such as 8×8, Inc.) to record video coaching sessions and schedule the distribution or share them with the agents at a later time. The agents can then view the coaching sessions and provide feedback or ask questions accordingly.

In one specific example, an apparatus and/or method involve and/or an apparatus involve a system for data communications in a contact center. The system includes a network-enabled communications circuit, a user interface circuit, and a communication engine. The network-enabled communications circuit is to route or convey data communications for a plurality of endpoint devices associated with contact center agents of a client entity, from among a plurality of client entities, registered to receive data-communications services including the data communications. The data communications include data communications between respective contact center agents and end users, and data communications between the respective contact center agents and a supervisory user to oversee actions involving one or more of the data communications. The user interface circuit is to, in response to the supervisory user selecting an association linked to the one or more of the data communications, enable the supervisory user to access live data communications involving the selected association, including providing access to live audio or video communications, and generate and present analytics data based on characteristics of the live data communications, and historical characteristics, of data communications involving the selected association. The communication engine, including one or more servers, is to provide asynchronous communications involving one or more individuals designated on behalf of the client entity. The asynchronous communications include video communication data generated in response to the analytics data for delayed access by the one or more individuals designated on behalf of the client entity.

Another computer-implemented embodiment is carried out as follows. Data communications are routed or conveyed, via a contact center operating through a network-enabled communications circuit, on behalf of a plurality of endpoint devices. In response to a supervisory user selecting an association linked to the one or more of the data communications, the supervisory user is enabled to oversee or review actions involving one or more of the data communications and to access live data (e.g., character-based, code-based, audio, image-based and/or video) communications involving the selected association. Also in response to the selection of the association, analytics data is generated and presented based on characteristics of the live data communications, and historical characteristics, of data communications involving the selected association. Using one or more servers, asynchronous communications involving one or more individuals designated on behalf of the client entity are provided, the asynchronous communications including video communication data generated in response to the analytics data for delayed access by the one or more individuals designated on behalf of the client entity.

Another embodiment is directed to a computer-implemented method carried out as follows. Utilizing a network-enabled communications circuit, data communications are routed or conveyed for a plurality of endpoint devices associated with contact center agents of a client entity, from among a plurality of client entities, registered to receive data-communications services including the data communications. The data communications include data communications between respective contact center agents and end users, and data communications between the respective contact center agents and a supervisory user to oversee actions involving one or more of the data communications. In response to the supervisory user selecting an association linked to the one or more of the data communications, the supervisory user is enabled to access live data communications involving the selected association, including providing access to live audio or video communications, and analytics data is generated and presented based on characteristics of the live data communications, and historical characteristics, of data communications involving the selected association. Using one or more servers, asynchronous communications involving one or more individuals designated on behalf of the client entity are provided. The asynchronous communications include video communication data generated in response to the analytics data for delayed access by the one or more individuals designated on behalf of the client entity.

Another embodiment is directed to an apparatus comprising a computer and communications circuit and one or more servers. The computer and communications circuit routes or conveys data communications for a plurality of endpoint devices associated with contact center agents, and provides supervisory user to access to live data communications involving the data communications for the plurality of endpoint devices associated with contact center agents. The computer and communications circuit may further generate and present analytics data based on characteristics of the live data communications, and based on historical characteristics of the routed or conveyed data communications. The one or more servers provide asynchronous communications involving one or more of the contact center agents, including video communication data generated in response to the analytics data for delayed access by the one or more contact center agents.

Certain embodiments are directed to a user interface circuit (e.g., a computer with screen) operable to respond to a supervisory user selecting an association from a database linked to one or more data communications with endpoint devices, by enabling the supervisory user to access live data communications (e.g., audio and/or video communications) involving the selected association. The user interface circuit (e.g., in connection with analytics circuitry) may generate and present analytics data based on characteristics of the live data communications, and historical characteristics, of data communications involving the selected association. Such historical aspects may, for example, be stored in a database and pertain to historical communication streams. A communication engine, including one or more servers, provides asynchronous (delayed) communications involving one or more individuals designated on behalf of the client entity and including video communication data generated (e.g., by the supervisory user) in response to the analytics data for delayed access by the one or more individuals designated on behalf of the client entity.

The above discussion is not intended to describe each aspect, embodiment or every implementation of the present disclosure. The figures and detailed description that follow also exemplify various embodiments.

BRIEF DESCRIPTION OF FIGURES

Various example embodiments, including experimental examples, may be more completely understood in consideration of the following detailed description in connection with the accompanying drawings, each in accordance with the present disclosure, in which.

Figure 1A:
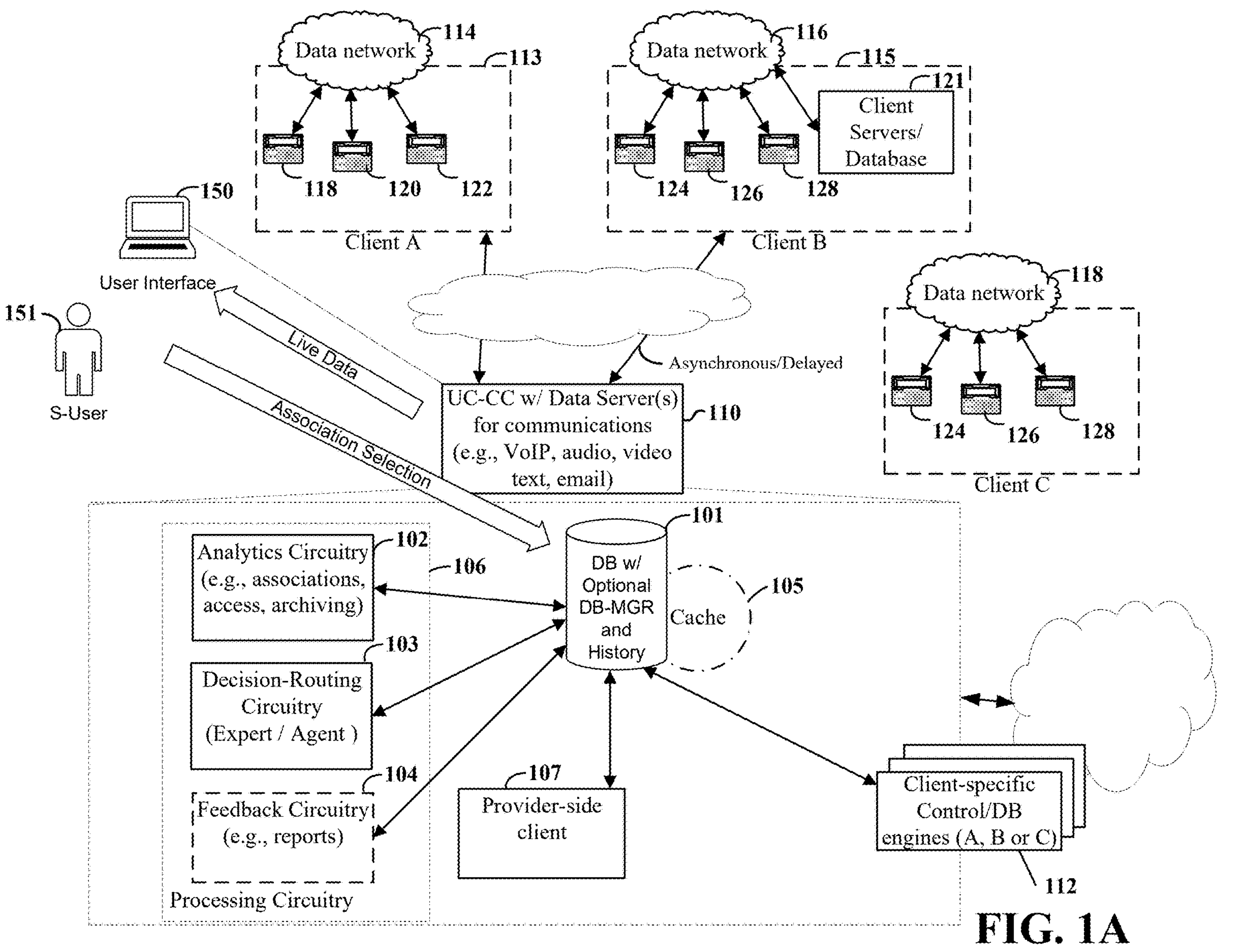
FIG. 1A illustrates an example data-communications system, as may be implemented in accordance with one or more aspects of the disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Various aspects and examples according to the present disclosure are directed to issues such as those addressed above and/or others which may become apparent from the following disclosure involving methods and systems in which coaching may be provided.

Aspects of the present disclosure are believed to be applicable to a variety of different types of apparatuses, systems and methods involving devices characterized at least in part by asynchronous communications and related data/system processing. More specific aspects involve presenting characteristics of particular communications for assessment (manual and/or automated, as may include ML/AI aspects), generating, storing and later communicating data such as audio and/or video data, relating to the assessment. While the present disclosure is not necessarily limited to such aspects, an understanding of specific examples in the following description may be understood from discussion in such specific contexts.

Accordingly, in the instant description various specific details are set forth to describe specific examples presented herein. It should be apparent to one skilled in the art, however, that one or more other examples and/or variations of these examples may be practiced without all the specific details given herein. In other instances, well-known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

While the following discussion refers to certain examples in the form of systems, features and/or methods, such discussion is for providing merely an exemplary context to help explain such aspects, and the present disclosure is not necessarily so limited. The examples and specific applications disclosed herein may be implemented in connection with one or more aspects, examples (or example embodiments) and/or implementations, whether such aspects are considered alone or in combination with one another.

Exemplary technical advantages provided by processing described in the present disclosure comprise but are not limited to the following. Certain aspects are directed to facilitating the management and implementation of bandwidth-based content delivery, for instance by recording video communications and subsequently delivering those communications in a manner that balances congestion on certain communication channels. Other aspects are directed to providing on-demand video communications, such as by facilitating back-and-forth video communications between respective network-enabled terminals, which may allow for asynchronous conversations or other communications (e.g., data, text) that may not otherwise be achievable. Other aspects involve providing analytical analysis relevant to live communications, for example by iteratively processing data pertaining to live communications and presenting analytics concerning the live communications for use by a user preparing and recording the aforementioned video communications. Further aspects involve automatically assessing data communications and categorizing the communications based on the assessment, which may further facilitate utilizing the categorization to identify and present communication enhancements. Such aspects may involve various ML/AI implementations, as described further herein. These aspects may improve the operation of endpoint devices and related communications systems, enhancing communication efficacy and reducing operational overhead of the endpoints, for instance by reducing the need to monitor and transmit/receive live video communications.

Various aspects of the present disclosure are directed to systems and methods that implement trained AI processing to further contemplate other types of signal data that may be collected through various host applications/services (e.g., pertaining to a software platform). For instance, application of trained AI processing (e.g., one or more trained machine learning models may be adapted to evaluate not only data and data sources integrated with a contact center and/or a user interface for providing supervised monitoring and related interaction, but other types of contextual data including past and/or current user actions, user preferences, application/service log data, etc., that are each associated with one or more users, entities, systems and/or endpoint devices. This additional signal data analysis may help yield determinations as to how (and/or when) to generate updated analytics (in real-time or near real-time) and/or reporting, as well as when and how often to present data insights and/or suggestions.

Non-limiting examples of signal data (or any data) that may be collected and analyzed includes but is not limited to: device-specific signal data collected from operation of one or more user computing devices; user-specific signal data collected from specific tenants/user-accounts with respect to access to any of: devices, login to a distributed software platform, applications, services, etc.; application-specific data collected from usage of applications/services and associated endpoints (including third-party endpoints integrated within a software platform), data collected from disparate software platforms that provide disparate types of data communications; or a combination thereof. Analysis of such types of signal data in an aggregate manner may be useful in helping generate contextually relevant determinations, data insights, etc. Analysis of exemplary signal data may comprise identifying correlations and relationships between different types of signal data specific to user usage of one or more software data platforms (e.g., communications software platforms), where telemetric analysis may be applied to generate determinations with respect to a contextual state of user activity with respect to different host application/services and associated endpoints. Analyzing of signal data, including user-specific signal data, may occur in compliance with user privacy regulations and policies.

In some examples, one or more components are configured to manage application of one or more AI models to enhance processing described in the present disclosure. Trained AI processing is applicable to aid any type of determinative or predictive processing including specific processing operations described with respect to determinations, classification ranking/scoring and relevance ranking/scoring. An exemplary component for implementing trained AI processing may manage AI modeling including the creation, training, application, and updating of AI modeling. Trained AI processing may be adapted to execute specific determinations described herein including those for analyzing specific data and data sources of a software data platform (e.g., a communications software platform) and/or generating insights for data augmentation. For instance, an AI model may be specifically trained and adapted for execution of processing operations pertaining to analyzing features and functionality of an XCaaS offering including those non-limiting examples previously described. Non-limiting examples of AI implementations include but are not limited to: analyzing data (and metadata) associated with one or more software platforms including third-party integrations; analyzing individual communications between contact center agents and end users, such as to assess efficacy and quality; generating contextual determinations for improving user experience, improving analytics for performance analysis; and linking solutions for disparate applications. Exemplary AI processing may be applicable to aid any type of determinative or predictive processing by any components of the present disclosure, via any of: learning for curating displays, learning for prioritizing opportunities, and learning for manners in which to assess and/or present respective opportunities, among other examples. In one example, trained AI processing comprises a hybrid AI model (e.g., hybrid machine learning model) that is adapted and trained to execute a plurality of processing operations described in the present disclosure. In alternative examples, trained AI processing comprises a collective application of a plurality of trained AI models (e.g., three or more trained AI models) that are separately trained and managed to execute processing described herein. In alternative examples, the present disclosure extends to integrating third-party AI modeling and further adapting and customizing said AI modeling to work with specific data and data sources of an exemplary software platform. For example, a third-party AI model may be adapted to work with a communications software platform including data, data sources, and integrations (e.g., APIs, web hooks, etc.) related to XCaaS features and functionality. In examples where a plurality of independently trained and managed AI models is implemented, downstream processing efficiency may be improved by an ordered application of trained AI models where processing results from earlier applied AI models can be propagated to subsequently applied AI models. For example, a trained AI model may evaluate data communications between contact center agents and end users, and derive data correlations to improve processing and efficiency including suggestions for reallocation of resources and/or optimization of instructions/operations to be sent to the contact center agents, which may then be utilized to suggest actions (and/or reallocation of resources as may be appropriate) to improve efficiency and quality of services provided.

Non-limiting examples of supervised (or other) learning that may be applied comprise but are not limited to: nearest neighbor processing; naive Bayes classification processing; decision trees; linear regression; logistic regression, deep neural networks, support vector machines (SVM) neural networks (e.g., convolutional neural network (CNN) or recurrent neural network (RNN)); linear discriminant analysis, learning vector quantization, and transformers, among other examples. Non-limiting examples of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting examples of semi-supervised learning that may be applied comprise but are not limited to: assumption determination processing; generative modeling; low-density separation processing and graph-based method processing, among other examples. Non-limiting examples of reinforcement learning that may be applied comprise but are not limited to: value-based processing; policy-based processing; and model-based processing, among other examples. Furthermore, a component for implementation of trained AI processing may be configured to apply a ranker to generate relevance scoring to assist with any processing determinations with respect to any relevance analysis, such as that described herein. Scoring for relevance (or importance) ranking may be based on individual relevance scoring metrics described herein or an aggregation of said scoring metrics.

In some examples, for instance where multiple relevance scoring metrics are utilized, a weighting may be applied that prioritizes one aspect over another, such as one relevance scoring metric over another, depending on the data collected and the specific determination being generated. Adaptive learning and training may be utilized by analyzing specific data sets pertaining to efficacy and efficiency of contact center agent communications with end users. Models may be customized through priority, weighting, or other approach. Results of a relevance analysis may be finalized according to developer specifications. This may comprise a threshold analysis of results, where a threshold relevance score may be comparatively evaluated with one or more relevance scoring metrics generated from application of trained AI processing.

In a more particular embodiment, a system is provided for data communications in a contact center. The system includes a network-enabled communications circuit, a user interface circuit, and a communication engine. The network-enabled communications circuit routes or conveys data communications for a plurality of endpoint devices associated with contact center agents of a client entity, from among a plurality of client entities, registered to receive data-communications services including the data communications. The data communications may include data communications between respective contact center agents and end users, and data communications between the respective contact center agents and a supervisory user to oversee actions involving one or more of the data communications. The user interface circuit is responsive to the supervisory user selecting an association linked to the one or more of the data communications by enabling the supervisory user to access live data communications involving the selected association. This includes providing access to live audio or video communications. The user interface circuit (and/or a related circuit) may generate and present analytics data based on characteristics of the live data communications, and historical characteristics, of data communications involving the selected association. The communication engine includes one or more servers and operates to provide asynchronous communications involving one or more individuals designated on behalf of the client entity. The asynchronous communications include video communication data generated in response to the analytics data for delayed access by the one or more individuals designated on behalf of the client entity. The system may further include a recorder, coupled to the one or more servers, to record the live data communications.

Such an approach may be implemented, for example, for optimizing communication load distribution over network communication circuits (e.g., relative to live video communication). For instance, by asynchronously delivering video, typical issues with buffering and other network congestion problems may be avoided or overcome, as respective video frames do not need to be communicated in a timely fashion.

Figure 1B:
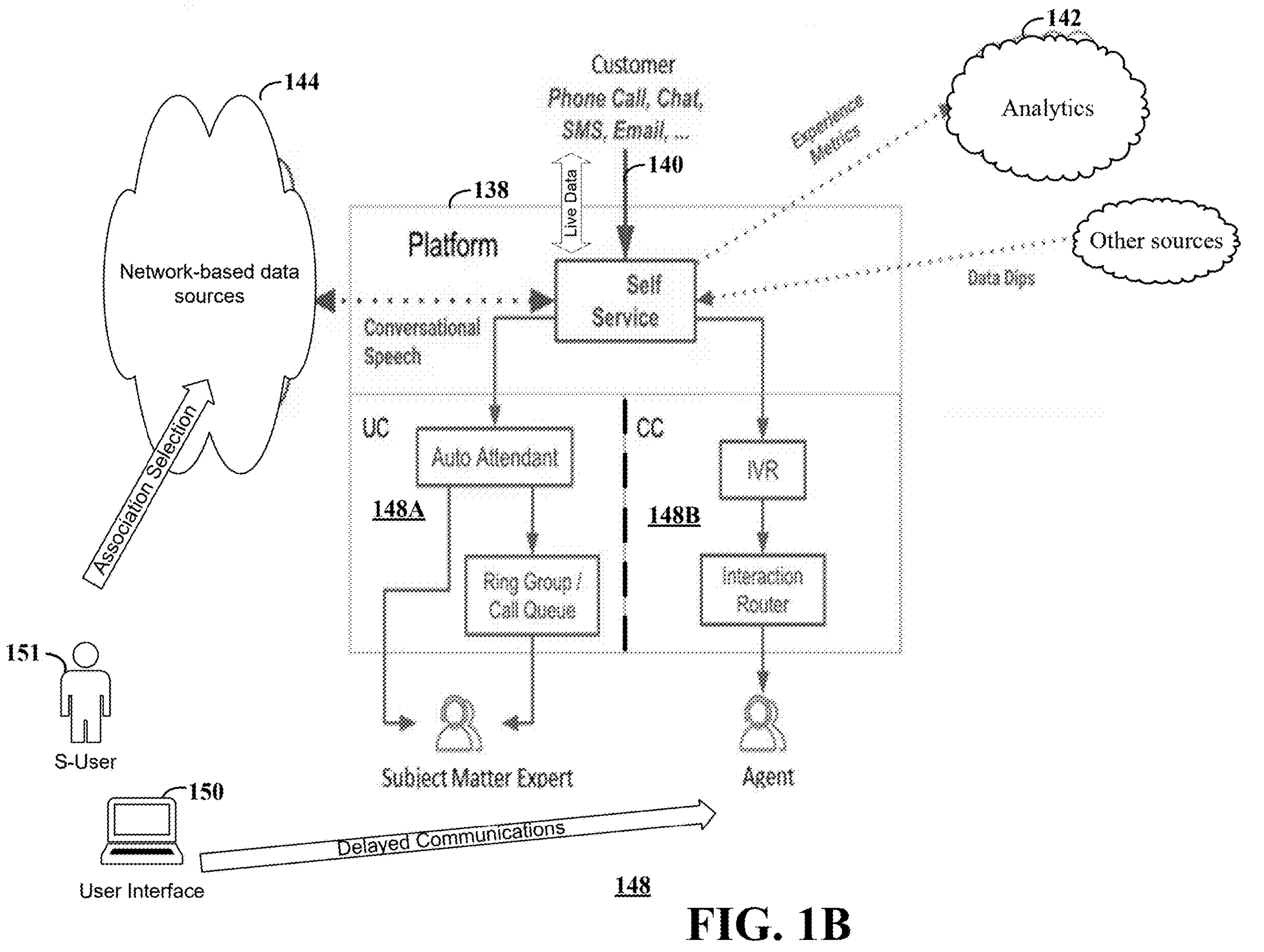
FIG. 1B illustrates another example data-communications system which is related to the system shown in FIG. 1A.
Figure 1C:
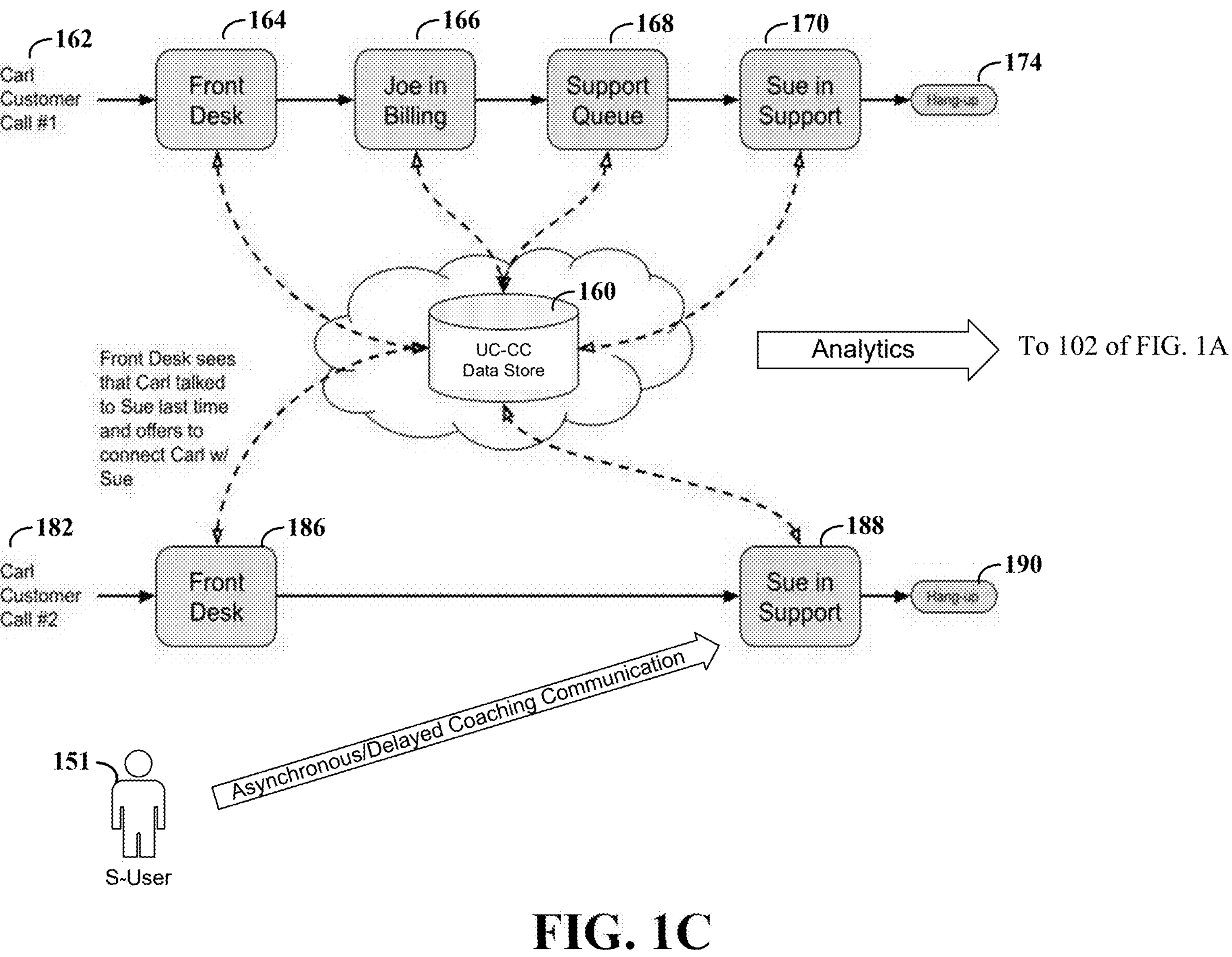
FIG. 1C is an example data-flow diagram that may be implemented by one or more of the communications system depicted through FIGS. 1A and 1B.
Figure 2:
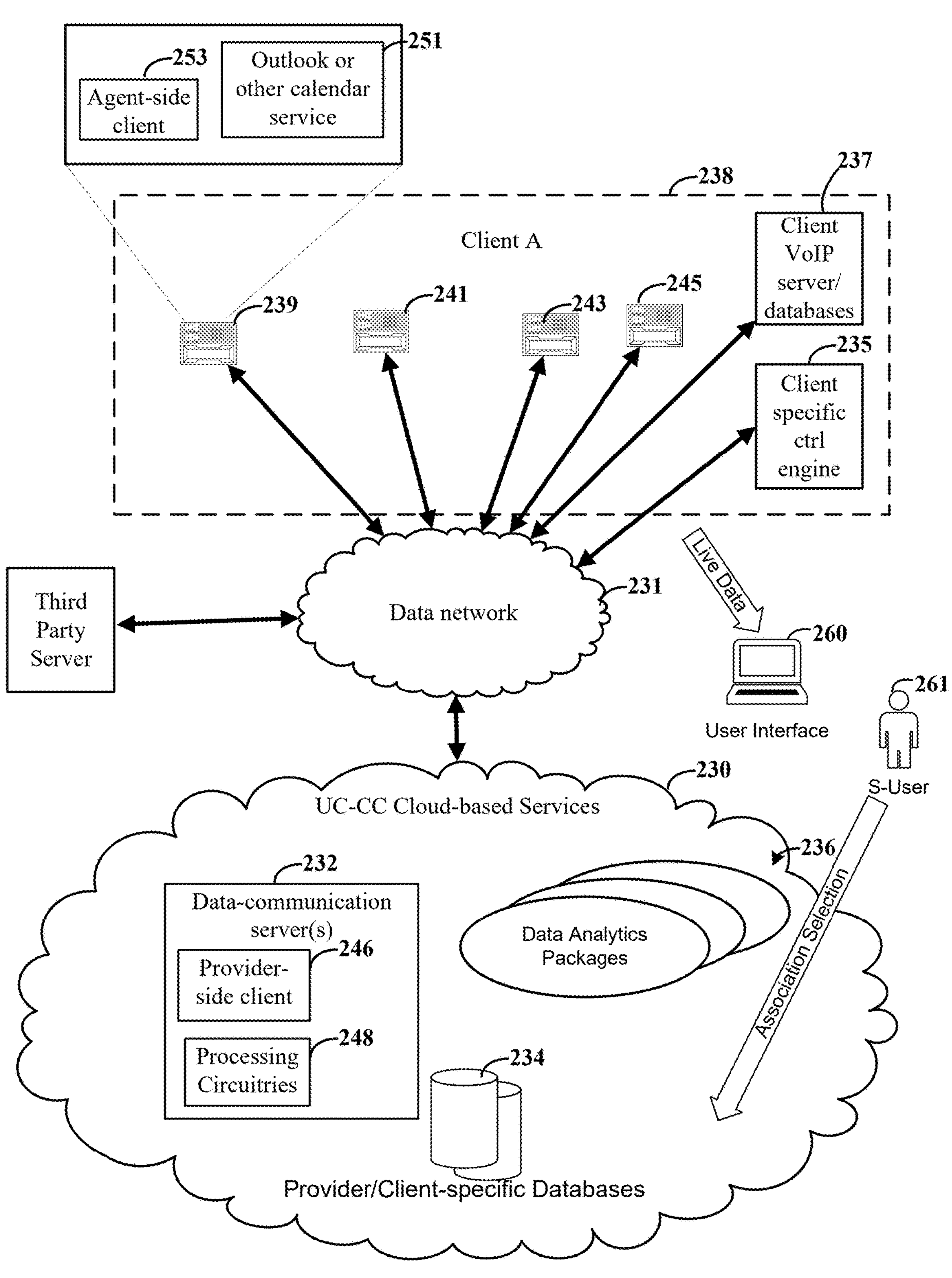
FIG. 2 illustrates another example data-communications system having aspects that may be implemented in accordance with the present disclosure.

Referring to the figures, FIG. 1A may be implemented with such a user interface circuit 150 operable in response to a supervisory user 151, providing access to live data communications and related provision of asynchronous (delayed) communications, utilizing analytics data. Similarly, FIG. 1B (as may be implemented with FIG. 1A) also shows related supervisory interaction with asynchronous/delayed communications. FIG. 1C shows a particular implementation involving the provision of data that can be used to generate such analytics, with related asynchronous coaching data being provided to an agent. FIG. 2 may also be implemented with such aspects in which a supervisory user 261 operates via a user interface 260 for monitoring live communications and providing asynchronous coaching input. These aspects are discussed in greater detail below.

The communication engine may provide the asynchronous communications between the supervisory user and contact center agents by recording video communication data generated by the supervisory user while that user is monitoring accessing the live audio or video communications between a selected one of the contact center agents and an end user, and asynchronously communicating the generated video communication data to the selected contact center agent at a later time.

In certain embodiments, the asynchronously-presented video communication data may be restricted for a period of time from access by a subset of the one or more individuals designated on behalf of the client entity. The period of time may be indicated by data generated in conjunction with the asynchronously-presented video communication data. The subset of the individuals may include the at least one of the contact center agents, and/or one of the endpoint devices, linked to the selected association.

The selected association may involve one or more of a variety of characteristics. For instance, the selected association may include an action item involving one or both of audio feed or a video feed, identity data linked to the at least one contact center agent, identity data linked to at least one of the plurality of endpoint devices, or a combination thereof.

In a more particular embodiment, the user interface circuit is responsive to the supervisory user selecting one of the contact center agents by enabling the supervisory user to access live data communications involving the selected contact center agent, including providing access to live audio or video communications involving the selected contact center agent. In such an embodiment, the communication engine may asynchronously present video communication data generated by the supervisory user in response to the analytics data, by recording the video communication data and presenting the recorded video communication data for delayed access by the selected contact center agent. The communication engine may asynchronously communicate data generated by the selected contact center agent in response to the delayed access to the video communication data, by recording video communication data involving the selected contact center agent and presenting the recorded video communication data for delayed access by the supervisory user.

The user interface circuit may operation in a variety of manners. In some implementations, the user interface circuit enables the supervisory user to access the live data communications involving the selected association by providing access to live data communications between the selected contact center agent and an end user. The user interface circuit may enable the supervisory user to access live data communications involving the selected association by providing access to live data communications including data selected from the group of: audio, video, text, media, images, screenshots, documents, and a combination thereof.

In certain embodiments, the system further includes analytics circuitry coupled to the communications circuit and configured to identify data insights exhibited by the data communications between the respective contact center agents and the end users, and assessment circuitry coupled to the communications circuit and to the analytics circuitry. The assessment circuitry is configured to classify the identified data insights relative to categories of data communication conditions pertaining to communications between the contact center agents and endpoint device users. The assessment circuitry further generates a recommended data-communication condition based on the classification of the identified data insights, wherein the recommended data-communication condition is included with the asynchronous communications.

One or more of the aforementioned systems may further include a data repository server having training content. The assessment circuitry may generate the recommended data-communication condition to include training content from the data repository server. The communication engine may include training content from the data repository server with the video communication data generated in response to the analytics data.

The system may further include a predictive learning circuit that assesses characteristics of the data communications between the respective contact center agents and the end users, including associating the data communications with one or more data communication categories based on the assessed characteristics. The predictive learning circuit may further generate data insights based on characteristics of the data communications and characteristics of other data communications in the one or more associated data communication categories, including generating and outputting a recommended action for the associated data communications.

Associating the data communications with one or more data communications categories may include associating the data communications with data communication categories selected from the group of: services, integrations, communication features, and a combination thereof. Generating the data insights may include assessing technical issues in the characteristics of the data communications, and outputting a recommended action in accordance with similar technical issues addressed in the one or more data communication categories.

In certain implementations, the predictive learning circuit trains, using data indicative of characteristics of communications between the plurality of endpoint devices and the contact center agents, a machine learning model to provide a trained machine learning model. The characteristics of the data communications are assessed by inputting, into the trained machine learning model, characteristics of the live data communications involving the selected association. An output indicative of data communication characteristics associated with the live data communications is received from the trained machine learning model, and the data insights are generated based on the output.

Another embodiment is directed to a computer-implemented method carried out as follows. Utilizing a network-enabled communications circuit, data communications are routed or conveyed for endpoint devices associated with contact center agents of a client entity, from among a plurality of client entities, registered to receive data-communications services including the data communications. For instance, contact center agents operating on behalf of a particular entity may be utilized for providing data communications to end users. The data communications also include data communications between respective contact center agents and a supervisory user to oversee actions involving one or more of the data communications.

In response to the supervisory user selecting an association linked to the one or more of the data communications, the supervisory user may be enabled to access live data communications involving the selected association, including providing access to live audio or video communications such as may occur between one of the contact center agents and an end user. Analytics data is generated and presented based on characteristics of the live data communications, and historical characteristics, of data communications involving the selected association. For instance, the live data communications can be assessed relative to historical data communications between the contact center agent and end users, and/or between multiple contact center agents and end users. Asynchronous communications involving one or more individuals designated on behalf of the client entity are provided, for example using one or more servers (e.g., which may store and later send such communications). The asynchronous communications may include video communication data generated in response to the analytics data for delayed access by the one or more individuals designated on behalf of the client entity.

Another computer-implemented embodiment is carried out as follows. Data communications are routed or conveyed, via a contact center operating through a network-enabled communications circuit, on behalf of a plurality of endpoint devices. In response to a supervisory user selecting an association linked to the one or more of the data communications, the supervisory user is enabled to oversee or review actions involving one or more of the data communications and to access live data (e.g., character-based, code-based, audio, image-based and/or video) communications involving the selected association. Also in response to the selection of the association, analytics data is generated and presented based on characteristics of the live data communications, and historical characteristics, of data communications involving the selected association. Using one or more servers, asynchronous communications involving one or more individuals designated on behalf of the client entity are provided, the asynchronous communications including video communication data generated in response to the analytics data for delayed access by the one or more individuals designated on behalf of the client entity.

In some instances in which the supervisory user selects the association linked to the one or more of the data communications by selecting one of the contact center agents, the supervisory user is enabled to access live data communications involving the selected contact center agent. This includes providing access to live audio or video communications involving the selected contact center agent. Providing the asynchronous communications in such instances includes asynchronously presenting video communication data generated by the supervisory user in response to the analytics data, by recording the video communication data and presenting the recorded video communication data for delayed access by the selected contact center agent.

In a further implementation, data generated by the selected contact center agent, in response to the delayed access to the video communication data, is asynchronously communicated by recording video communication data involving the selected contact center agent and presenting the recorded video communication data for delayed access by the supervisory user.

Certain industry-specific example embodiments (again without limitation) may be implemented as follows, in accordance with the present disclosure. The first industry-specific example embodiment is directed to asynchronous video approaches and related systems for coaching, and the following five steps exemplify aspects of one such approach for use in a given system.

These steps include:

1) Create a coaching video;
2) Save the coaching video;
3) Assign the coaching video to user(s) (e.g., agent or group of agents);
4) Asynchronous meetings may be conducted between users via video clips (clips can be appended to create the equivalent of a meeting in video clip segments); and
5) ML/AI may be applied to enhance video clips and create contextual annotations to append to clips (e.g., content summaries, bullet points, etc.).

This approach may involve, for example, providing supervisory access to data communications between endpoint devices and contact center agents, such as live data communications (as may be recordings of such live communications), as well as analytics data generated based on characteristics of the live data communications and historical characteristics of data communications involving the selected association. Asynchronous communications involving the contact center agent terminals and a supervisory terminal, including the video communication data (the coaching video) generated in response to the analytics data, for delayed access by the one or more individuals designated on behalf of the client entity.

In various instances, a supervisory user as noted herein may carry out noted functions inside workspaces, such as those characterized hereinabove in connection with those provided by the assignee, 8×8, Inc, such as UX (user experience) and/or UI (user interface) functionality accessible inside 8×8 Work and integrated apps. One such example is the Supervisor Workspace functionality. While specific user interface (UI) screenshots are not shown, it is sufficient to describe this approach/functionality using a supervisor workspace as an exemplary context: In this context, a supervisor is reviewing the analytics/metrics on agent performance, and wishes to provide a specific agent (e.g., "Joan Smith") with a coaching tip. The supervisor can select the agent from the list of agents show below, and a UI feature callout can be selected to create a coaching video for that agent. A video clip can be made such as for or during a meeting with the ability to share screen, share attachments, add notes, etc.

The present disclosure is applicable in any user engagement scenario provision of service-based communications across the internet (e.g., cloud-based communication services). In more specific examples, various aspects of the present disclosure may work in connection with any of various types of systems providing unified communications (e.g., unified communications as a service, 'UCaaS'), contact center communications (e.g., contact center as a service, "CCaaS'), communications platform as a service ("CPaaS"), and/or a combination thereof (e.g., providing a platform which may be referred to as XCaaS (Experience Communications as a Service)). Exemplary communications platforms in this regard include a UC-CC platform (as discussed and exemplified in connection with examples herein such as n FIG. 1A or FIG. 1B) and a XCaaS platform (e.g., the 8×8 XCaaS Platform). Among various specific example implementations, the XCaaS platform is designed from the ground up to support a vibrant ecosystem of deeply integrated applications or services providing a unified user experience enabling global communications through a plurality of communication channels, omnichannel interaction orchestration, extensible workspaces, customer interaction data, analytics and reporting, administrative console management of features and functionalities, third-party integrations of apps/services, widgets, etc., and machine learning and artificial intelligences, among other features and functionalities.

An exemplary communications platform is configurable to enable coaching tips (as files or data streams) to be generated and utilized across the entirety of the XCaaS platform where a coaching tip may be generated in a first communications service (e.g., UCaaS) and shared and utilized between services enhance service experience, enabled added features functionalities, etc. in additional communications services (e.g., CCaaS and/or CPaaS). For example, a coaching tip may be created in a UCaaS service scenario (e.g., a manager of a company coaching an employee about a product or service) and that coaching tip may be general enough that it is applicable in a CCaaS service scenario (e.g., usable for sharing with a support agent that interacts and supports customers of the company). Further expanding that example, the support agent (CCaaS) may asynchronously append the coaching tip with further content (coaching tips), where the updated coaching tip can be shared back with the original users (e.g., UCaaS service scenario) and/or other users including users involved in a different service scenario such as provision of CPaaS services. In examples where coaching tips are asynchronously appended, an exemplary communications platform may be configured to control the method of delivery of appended coaching tips. For instance, configurable settings can be applied to sharing of coaching tips including those that may control: sharing with users; automatic delivery and notification of updated coaching tips; creation of separate files/data streams (e.g., parent/child nodes, derivative file or data stream); or other-scenario specific instances or rules (e.g., auto-share coaching tip in some cases but not others), among other non-limiting examples. Over time, through applied ML/AI modeling, modeling may be trained to learn user preference and behaviors and provide automated suggestions related to a coaching tip including on classification on applicability of coaching tips and whether tips may be useful to share with other users in an organization including across different communications services of a communication platform to reach (e.g., XCaaS platform). In an example scenario where a UCaaS user generates a coaching tip, trained ML/AI modeling may be applied to provide suggestions on sharing with a CCaaS user as well as provide contextually relevant rationale as to why the coaching tip may be useful in specific scenarios. In this way, the large and extensive volume of data exclusively specific to an XCaaS platform can create customized and adapted use case scenarios unique only to said XCaaS platform."

Figure 3:
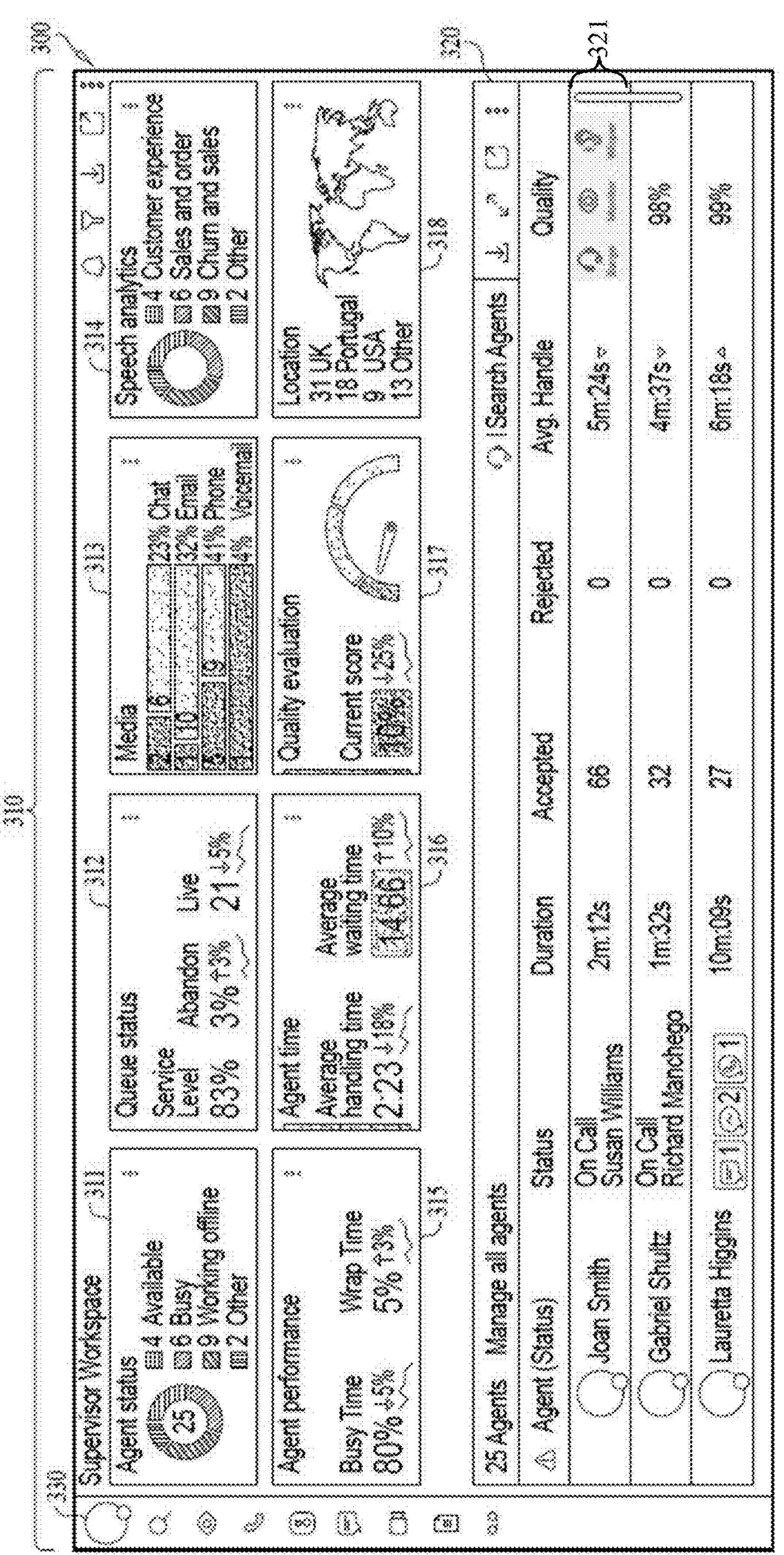
FIG. 3 shows a system with interface circuitry operable for data-communications with respective panes, as may be implemented in accordance with the present disclosure.

Turning again to the figures and specifically FIG. 3, a system 300 is shown with interface circuitry operable for data-communications with respective panes, as may be implemented in accordance with one or more embodiments. The system 300 may be implemented in a manner similar to that characterized with system shown in FIG. 1A, for instance as may be operable with and/or include network-enabled communications circuitry 110/113/114, user interface circuitry presentable at the respective endpoints and/or a call center at 110, and a communication engine as may be implemented with 110 and/or 112.

A universal workspace 310 and toggle control 330 are provided, the former displaying panes 311-320 and the latter providing a toggle between respective views (e.g., switching between a chat view displaying an ongoing chat dialogue, and a supervisor window with panes as shown). The panes may be deployed to utilize application-specific data sets obtained via disparate, remotely-operating application circuits, and can be tailored by user of the system 300. The panes may thus be utilized to provide analytics that can be used by a supervisory user to assess characteristics of agent-end user communications. Such analytics may also be utilized by a ML/AI algorithm to assess communications, such as to assess efficacy of similar communication types and provide recommendations for enhancing communications (e.g., for reducing computational overload and/or communication bandwidth). The system may thus facilitate interaction with and/or control of multiple disparate applications for obtaining different types of data as generated from the disparate applications, for common display.

Pane 320 depicts agent monitoring characteristics, in which a supervisory user may select and communication with specific agents. Referring to row 321, an agent "Joan Smith" is depicted. When this agent is selected, the panes 315-318 may be tailored to reflect characteristics of that agent's interactions/communications. A supervisory user of the universal workspace 310 may be provided with options including "barge," "monitor" and "whisper." The "barge" option may be selected and allow interjection of the supervisory user (i.e., participation) in a particular live communication session between the agent and an end user. The "monitor" option may allow the supervisory user to monitor live communications, such as by listening in on audio communications and/or viewing video communications. The "whisper" option may allow the supervisory user to communicate with the agent, such as by messaging the agent or speaking to the agent (e.g., masked from hearing by an end user communicating with the agent). The "whisper" function may thus allow the supervisory user to provide coaching input or other direction.

The universal workspace 310 may be utilized and implemented in a variety of manners. In certain embodiments, the universal workspace 310 is configured to provide a supervisory view, and may be implemented in accordance with one or more aspects as depicted in U.S. patent application Ser. No. 18/211,424, filed on Jun. 19, 2023 and entitled "COMMUNICATIONS SYSTEM INVOLVING SUPERVISORY VIEW FEATURE," which is fully incorporated herein by reference. For instance, supervisory interaction features as depicted in FIGS. 3-6 may be utilized in connection with one or more embodiments herein, such as by presenting a universal workspace as depicted with FIG. 3 in the instant disclosure. Asynchronous communications as depicted herein may thus be utilized in connection with the supervisory view aspects depicted in FIGS. 3-6 of the '424 application.

From any application used in connection with a provider of data-communications services (e.g., 8×8, Inc.) based on permissions, a user can select another user to access the option to send a recorded message, with the ability to share screen in the recording as well as share links to information and optionally leave a written message in the recording as well. In this example context, such an approach may involve the following steps:

Step 1 | Select a given user (e.g., "Joan Smith" in FIG. 3)

Figure 4:
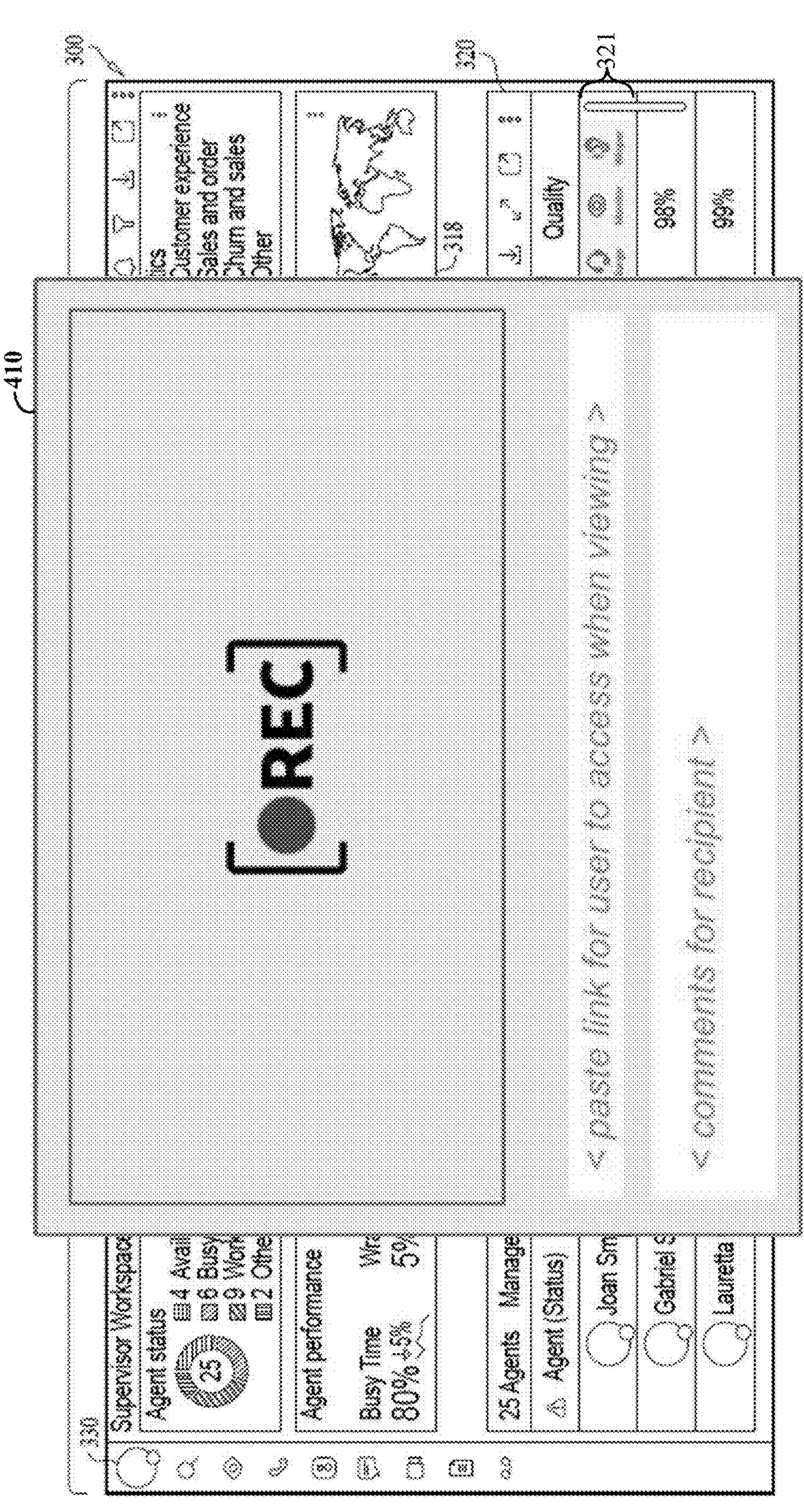
FIG. 4 depicts an approach for record coaching content, such as may be implemented with the system shown in FIG. 3, as may be implemented in accordance with the present disclosure.

Step 2 | Record coaching content, such as depicted at 410 in FIG. 4, in which a pop-up as shown is depicted as being displayed over the universal workspace 310 in response to a supervisory user clicking on agent "Joan Smith" to present one or more of a video message, text or a link to provide content to the agent.

Figure 5:
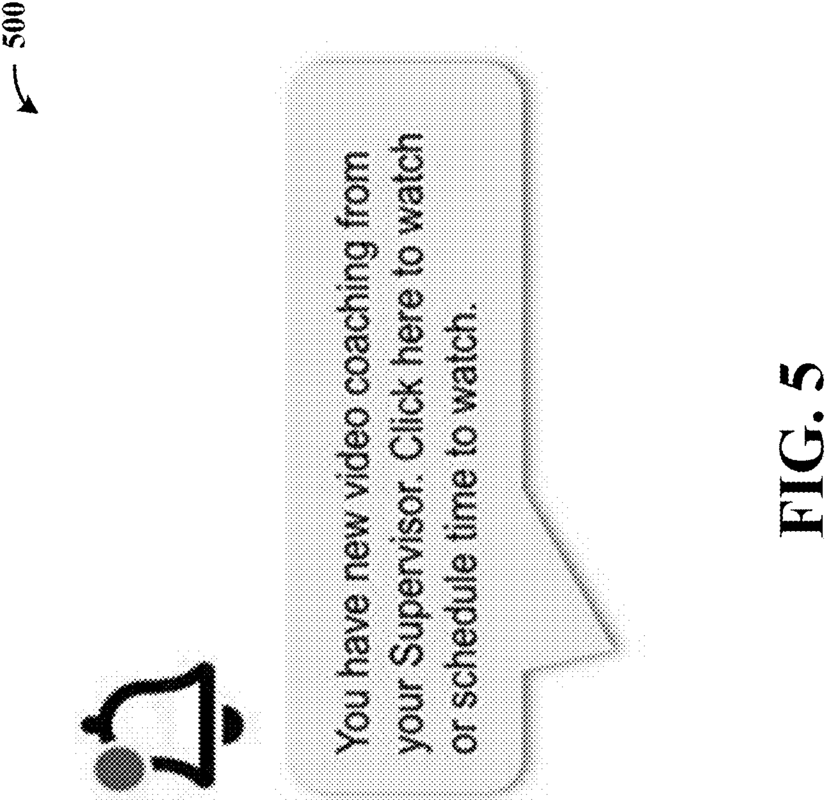
FIG. 5 depicts an approach for notifying an agent user of the availability of asynchronous content, as may also be implemented with the system shown in FIG. 3 and in accordance with the present disclosure.
Figure 6:
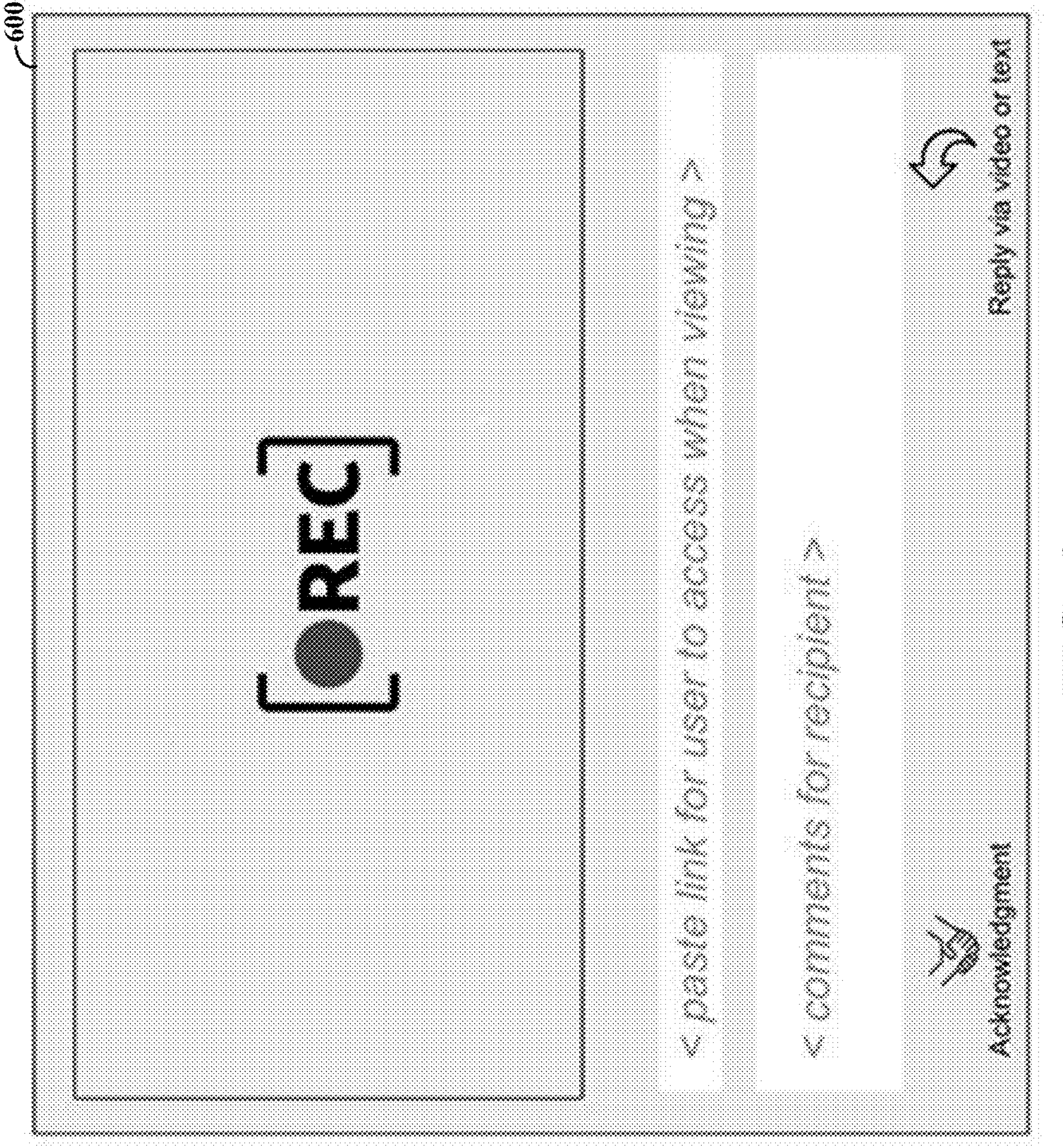
FIG. 6 depicts an approach for facilitating further asynchronous communications initiated by an agent, as may be implemented in accordance with the present disclosure.

Step 3 | An agent user is notified in their application notification center of the new coaching content. Such an approach may be implemented utilizing a pop-up 500 as depicted in FIG. 5, as may be presented in another universal workspace provided to the agent.

Step 4 | The agent user reviews the content with auto acknowledgment and optionally the user can reply. Such an approach may be implemented as depicted at 600 in FIG. 6 to present one or more of a video message, text or a link to provide content to the agent.

Furthermore, one or more algorithms (e.g., ML/AI algorithms) can be used to generate and surface data insights (user-specific, group specific or generalizes for users in similar scenarios) based on classification processing, Those insights can presented inline within a UX, through other connected modalities (e.g., email, chat, messaging), and/or through connected devices (including cascaded associated users/groups).

Figure 7:
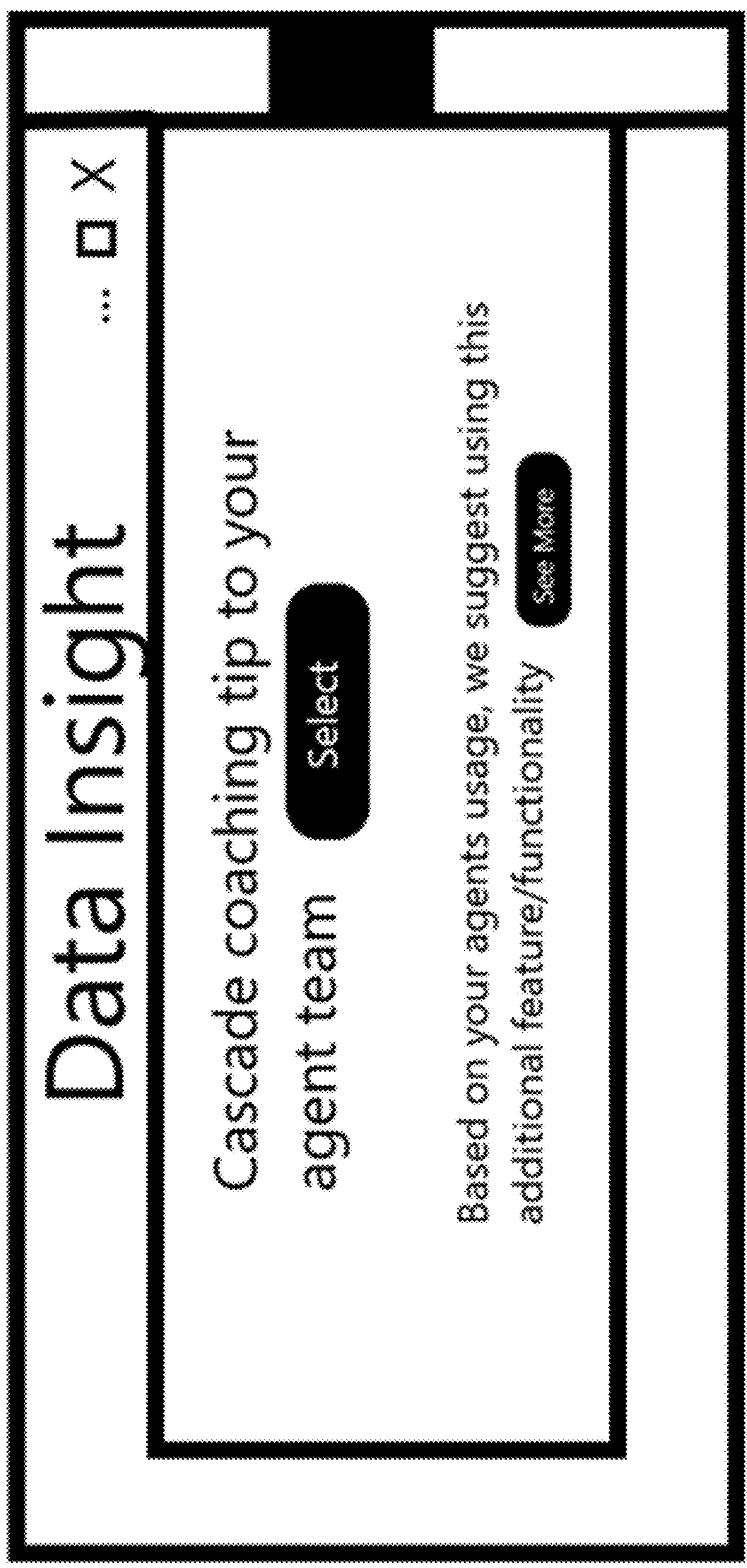
FIG. 7 depicts an example approach for presenting communications options/recommendations (e.g., AI/ML aspects) to a supervisory user, as may be implemented in accordance with the present disclosure.

FIG. 7 depicts an example approach for presenting such aspects to a supervisory user. Data insights may be presented as shown, for example as a pop-up over the universal workspace 310. Options may include cascading a coaching tip to a group of agents (e.g., an agent team), and ML/AI type approaches may present a link to suggested additional features/functionality as shown.

Referring again to FIG. 3, panes 311-320 may be utilized to display a variety of data, with FIG. 3 depicting specific examples. For instance, pane 311 displays agent status, which may be obtained by operating a remote application to interface with a plurality of agent-provided UX interfaces, obtain status information therefrom, and use the information to generate pane 310. Pane 312 depicts queue status, such as may pertain to customer stations waiting in queue. Pane 313 depicts media types being utilized and by percentage, for instance as pertaining to interactions between agent and customer endpoints. Pane 314 depicts speech analytics, for instance as may be generated by a remote speech analytics application that assesses speech characteristics to generate information characterizing data interactions (e.g., media, voice, imagery) with customer endpoints. Pane 315 depicts agent performance, for instance as may be gleaned by assessing an agent endpoint UX to show percentages of time during which an agent is interacting with a customer endpoint, time to wrap up customer interaction, and trending time as to whether these amounts are increasing or decreasing. Pane 316 depicts agent time characteristics pertaining to handling time (e.g., addressing issues) and waiting time. Pane 317 shows a quality evaluation, which may be generated by a remote application based on a variety of types of data. Pane 318 depicts location, which may for example show customer endpoint locations being served by agent stations. Pane 319 depicts queues, and pane 320 depicts specifics regarding individual agents. The data generated for each pane may be generated by multiple remotely operating applications, which may be native and/or third party, with the system 300 operating to interact with each application to pull data and generate the panes commonly displayed as shown.

Managed queues and associated metrics and analytics may be configurable by users, toggling on and off certain functionalities, to create a customized representation of status. For example, status with respect to providing customer support can be displayed, as may pertain to one or more of types of support, call queues, help desk tickets, who is waiting, what calls have been completed (or abandoned), how many agents are assigned to specific areas, wait times (as may include individual metrics such as average, longest, and shortest), SLA/availability/uptime. As previously referenced, it is to be recognized that users may completely customize their workspace (or workspaces), which may include any of: configuring the layout of their workspace with the ability to modify that configuration at any time to create new workspaces and/or workspace views; selecting the components and/or data sources that are integrated in their workspace/workspace view including dynamically changing components and/or data sources that are included in a workspace representation; selecting features/functionalities for reporting/analytics including an ability to toggle on/off features for reporting/analytics to further create customized reports in real-time (or near real-time); and configuring control over data insights/suggestions, among other examples. This information may be presented in real-time, or near real-time, with dynamic updates.

For instance, in the example shown in system 300, Pane 312, depicting queue status, illustrates real-time (or near real-time) changes to specific aspects (e.g., "abandonment" and "live") that are reflected from application of modeling that generates analytics and metrics relative to usage (e.g., created help desk issues, agent assignment and troubleshooting, and high-level results). Exemplary real-time analytics are applicable to any integrated component, for example, as shown in system 300 where Panes 315-317 also reflect real-time (or near real-time updates). Such analytics may be utilized to curate coaching instructions and related communications presented to agents. As further illustrated, updates to analytics or metrics may be emphasized in a UI for a user to quickly identify notable changes. As an example, key metrics applicable to a user configuration can be identified and emphasized when there are changes that a user should be made aware of. In other examples, various UI identifications may be allocated automatically to changes in metrics that pass a certain threshold. In the example shown in FIG. 3, key metrics in Pane 316 ("average waiting time") and Pane 317 ("current score" in "Quality Evaluation") are automatically updated and emphasized in different ways for a user. Developers can pre-configure key metrics and/or applicable thresholds, where metrics and/or thresholds may be configured in any manner without departing from the spirit of the present disclosure. In additional examples, updates and/or data insights, suggestions, etc., may also be sent to the user through other channels or modalities, devices, associated with a communications software platform. For instance, a user may associate multiple computing devices (e.g., desktop, mobile phone, tablet, etc.) with an integrated app/service, where updates can be sent to a user's mobile device, email, via chat, etc. in the event that a UI workspace is not being consistently monitored. Accordingly, agents can be managed from a supervisor perspective in real-time and assignments may be dynamically changed.

Further, UX menus may be changed in pane, including components that are included therein (which can ultimately change reporting and analytics). Individual panes can be selected and expanded/popped out for configuration within the pane, then return to a composed experience view. Among other functionalities shown, user interface element shown in Pane 319 (e.g., expansion symbol) is configured to provide a quick action to enable expansion/focus on a specific component or extension of workspace. In one example, a user of the adapted UI can create a separate workspace based on a specific component or combination of components such as the combination shown in Pane 319. For instance, a new workspace can be created around that set of components, or that set of components (e.g., Pane 319) can be incorporated into another template. This enables users to create a plurality of workspaces if desired and/or keep focus on specific components that they may wish to include in a main workspace representation. All in all, this functionality is yet another way the UX is extensible to create customized and/or focused workspaces that are adapted for an individual user or users. Workflow can be changed for a given day or set period of time (week, month, year, etc.). For instance, modes can be changed, end of day settings can be made (when an agent finishes work), or an emergency stop can be implemented to cut off a communication.

Panes as depicted in various figures and/or as described herein may be added or configured by searching for available sources, whether native or adding third-party components. Results can be added by drag and dropping desired components into place. This can also impact data analytics and reporting to provide more comprehensive and customized data. For example, a user may wish to select one or more components to generate metrics/graphing/reporting for, where reports can be easily generated for selected components through UX functionality. Additionally, users may wish to dive deeper and select specific features/attributes from components for reporting metrics (this may also apply to selecting features/attributes across different components to create fully customized reporting). Data insights, suggestions, and other details can also be generated and provided to users through UX, to mobile devices, or other endpoints. For instance, machine learning/artificial intelligence (ML/AI) can be applied to correlate data and generate customized data insights that are specific to an entity/or contemplate third-party integrations.

Another industry-specific example is directed to use of an omni-channel. Alternatively, one can link this functionality to any modality including chat (individual or group), email, append to meeting recordings, other videos, notes, task lists, etc.

Additionally, in connection with this example the system/approach can provide the capability to conduct an asynchronous meeting over content. For example, a user (e.g., manager) can send another user (e.g., employee) a coaching video and/or append content. The employee can then respond by further appending a video clip to that initial coaching video clip, whereby the two users can continue to exchange video clips asynchronously in an efficient manner and on their own time. In further examples, a series of clips can be appended together to compose the equivalent of a meeting. This configuration provides benefits as compared with traditional meeting content as the smaller video clips can easily be broken out (as separate parts) as well as used to highlight key (discussion) points.

Further, ML/AI algorithms can be integrated to classify and tag the video clips. This can help add context to video clips (and populate them with metadata such as tags for classification). For example, an ML/AI algorithm may be applied to determine key summary points from the video and that can be used to create a textual summary to append to the clip, and/or a list of key bullet points for review. This may create persistent notes for clips that can further be distributed to other users (with useful information appended). In the example of a communications software platform, training clips can also be categorized according to one or more types of service to which they are applicable (e.g., XCaaS, CCaaS, UCaaS, CPaaS and as also available and described at www.8×8.com). This can help organize training materials at a high-level. Further classifications can be used to drill-down into specifics of those communication types, personalized for a user, persona, tenant, etc.

Moreover, approaches as characterized herein may feed into a large-scale communications software platform. It fosters development of coaching content for Contact center training or other areas software platforms including with the benefit of potentially using real-world examples. For example, a manager (or supervisor) can make a training video pertaining to agent call handling (of a contact center), highlighting some of the positives and negatives, offering insights into handling specific situations, etc. In further examples, this video can be modified for different technical areas that agents may be servicing, for example, in a contact center of a communications software platform (e.g., XCaaS). For example, the initial training clip may be resolving a technical dispute for a customer with a phone configuration issue. However, this training (or parts thereof) may also be applicable to dealing with chat room configuration issues managed by different agents. In this way, training can be applicable in different ways (and to different users) across a communication software platform. Data insights and (included suggestion feature/functionality usage, expansion of services, integrations, etc.) can be generated and surfaced through UX, connected devices, other modalities, etc. Note that such data insights can be surfaced for that specific user or tenant or anonymized and surfaced to other users, for example, encountering similar technical issues that could be resolved more efficiently or that may benefit from certain features, functionality, etc.

Some example use cases for training materials include those for call routing, contact center agent management, internal documentation, Admin Console, account registrations for SMS/MMS, meeting management, data retention policy management, third-party integrations (e.g., ML/AI integrations), etc. This can be used as a building block for development of universal training content. In the above example where classifications/annotations/tags are applied, training content can be categorized and synced as a data repository (or repositories) with one or more management components (e.g., managed by one or more servers) for access and distribution to training content. In certain applications, this can be used to help build a foundation of new and useful training materials as well as be a basis for data augmentation (e.g., clips of training material that can be incorporated into other content, basis for commentary, and/or modified).

Various further example aspects and embodiments are illustrated according to the present disclosure as follows: FIG. 1A illustrates an example data-communications system; FIG. 1B illustrates another example data-communications system which is related to the system shown in FIG. 1A; FIG. 1C is an example data-flow diagram that may be implemented by one or more of the communications system depicted through FIGS. 1A and 1B; and FIG. 2 illustrates another example data-communications system having aspects consistent with each of the above-illustrated example embodiments of the present disclosure.

One or more of the above aspects, systems, methods, etc. may be used by adapting an existing system such as shown in FIGS. 1A, 1B and 1C, and in FIG. 2. These figures are presented to depict aspects of certain example implementations (e.g., corresponding to that disclosed in one or more U.S. Patents assigned to the assignee of the present disclosure), according to the present disclosure, in which one of more of the above-described aspects may be implemented and used. In each such illustrated example, a data communications server system provides data-communications services including, as examples, VoIP, virtual office features (e.g., communications) via a contact-center such as exemplified by the assignee of the present disclosure (8×8, Inc. as indicated at www.8×8.com) and as characterized in one or more of the figures included as part of the present disclosure). For example, in certain of the FIGS. 1A, 1B and 1C, a block is depicted as a user endpoint (e.g., 118 of FIG. 1A) or as Client A/Client B of FIG. 1A. The agents/supervisors involved in such coaching may be viewed as corresponding to users of the user endpoints and operating on behalf of the associated Client A or Client B as depicted. In each of FIGS. 1A, 1B, 1C and 2, a data-communications system and/or platform (such as "8×8 Work" as offered by the assignee of the present disclosure and available at www.8×8.com) is shown to exemplify (without limitation) how such above-characterized example aspects and embodiments may be implemented.

In each such figures, the circuit-based blocks appears in more than one instance but it is appreciated that the one or more of these circuit-based blocks may be implemented and where multiple are implemented, such circuit-based blocks may be implemented as separate blocks or as one or more integrated/structurally-unified blocks; and one or more of these circuit-based blocks may be managed/controlled substantially independently a stand-alone (master) circuit or as a functionally-dependent (slave) circuit which is subservient to control of another circuit (e.g., circuitry as part of a user interface, one or more servers, etc.).

In connection with the following FIGS. 1A, 1B and 1C, various aspects described above may be recognized as corresponding to the above-described aspects including, as just some of many examples: from FIG. 1A, service-provider data servers corresponding to 110, databases corresponding to 101, 112 and 121, broadband network(s) corresponding to each cloud such as 118, and AI/ML engine(s) corresponding to analytics circuitry 102; and from FIG. 1B, AI/ML engine(s) corresponding to analytics circuitry 142 which may be part of the data-provider system platform and/or circuitry operated on behalf of a third party (e.g., big-data services company), a live receptionist-based and/or automated client-specific call center as corresponding to one or both of 148A and 148B (the latter operating in an integrated manner). Similarly, aspects corresponding to parts of FIGS. 2, 3A-3B and 4 will also be apparent. It will also be appreciated that aggregating data and different contexts of such data, as described in connection with these figures, may be part of the above-discussed data augmentation and development of the database(s).

FIG. 1A illustrates one such example data-communications system in block diagram form and consistent with certain of the above-related examples and aspects of the present disclosure. As shown in FIG. 1A, the data-communications system includes a data-communications server 110 configured to provide data communication services, including data communications such as VoIP calls and other types of interactions (e.g., text, chat, email, etc.), for a plurality of endpoint devices 118, 120, 122, 124, 126, 128 connected in one or more data networks 114, 116. In more specific embodiments, the data-communications server 110 includes an arrangement of coordinated servers such as one or more VoIP communications servers that provide VoIP communications and one or more other types of communications servers that provide such other forms of data communications service(s). Although FIG. 1A illustrates two data networks 114, 116 communicatively coupled to the data-communications server 110, examples are not so limited and the data-communications server 110 can be communicatively coupled to three or more data networks, including as examples but not limited to broadband networks such as the Internet, cellular-telephony and/or satellite communications networks, etc. Such networks and communicatively-coupled endpoint devices are configured to communicate with one another (directly and/or indirectly) using data-communications circuits which are typically wireless transceivers with user interfaces (graphic user interfaces, audible, etc.). For purposes of facilitating discussion, various specific embodiments are herein directed to methods and apparatuses that include the data-communications server 110 and processing circuitry 106 in one or more of the above-noted variety of forms. Although the processing circuitry 106 is illustrated as a component of the data-communications server 110, embodiments are not so limited and the processing circuitry can form part of or be separate from the data-communications server 110.

The endpoint devices are circuit-based instruments that may be used by personnel (or users) and include data communications-enabled circuitry, such as VoIP-enabled endpoint devices (e.g., IP phones, smart phones, tablets, and/or desktop computers with appropriate VoIP software applications) and/or non-data communication/VoIP enabled endpoint devices (e.g., plain old telephone service (POTS) telephones and cellular-capable devices). Each endpoint device may be respectively associated with an account of a respective client. Endpoint devices can be associated with a particular client account by registering the endpoint device with a particular client account serviced by the data-communications server 110. Registered devices for each client account can be listed in a respective account settings file stored by the data-communications server 110. In this example, endpoint devices 118, 120, and 122 are associated with an account 113 for a first client A and endpoint devices 124, 126, 128 are associated with an account 115 for a second client B. In such a manner, a plurality of endpoint devices can each be serviced by the data-communications server 110 in accordance with aspects of the present disclosure. One or more of the clients can have client servers and/or databases 121 used to implement a variety of different services.

Accordingly, the endpoint devices may be data-communications circuits that may be remotely located relative to the data-communications server 110 and may be respectively associated with remotely-situated client entities. In certain embodiments, the data-communications system may include the remotely-located data-communications circuits, and in some instances one or more of the endpoint devices correspond to and/or includes a computer or a smartphone (e.g., mobile phone or tablet) to function as a softphone by running application software; and/or a computer or a smartphone to operate natively within a web browser (e.g., using webRTC) and in turn the web browser is to run on a computer or a smartphone.

The system may include one or more processing circuits configured to implement client-specific control engines 112, which are configured to adjust the data-communications provided for each client account according to a respective set of control directives. For instance, the client-specific control engines 112 can adjust routing of an incoming interaction (e.g., a VoIP-type data or text communication) to or from a client account by generating client-specific sets of control data to the data-communications server 110.

The system shown in FIG. 1A may include a user interface circuit 150 (e.g., a computer with screen) operable to respond to a supervisory user 151 selecting an association from a database 101 linked to one or more data communications with endpoint devices (e.g., 118), by enabling the supervisory user to access live data communications (e.g., audio and/or video communications) involving the selected association. The user interface circuit 150 (e.g., in connection with analytics circuitry 102) may generate and present analytics data based on characteristics of the live data communications, and historical characteristics, of data communications involving the selected association. Such historical aspects may, for example, be stored in database 101 and pertain to historical communication streams. A communication engine, including one or more servers, may be implanted with the UC-CC 110 and processing circuitry 106 to provide asynchronous (delayed) communications as shown, involving one or more individuals designated on behalf of the client entity and including video communication data generated (e.g., by the supervisory user 151) in response to the analytics data for delayed access by the one or more individuals designated on behalf of the client entity.

In certain different embodiments, the client-specific control engines 112 are implemented in various locations. For example, client-specific control engines 112 for one or more client accounts can be implemented in a central server connected to, or incorporated with, the data-communications server(s) 110. Additionally or alternatively, one or more client-specific control engines 112 can be implemented by one or more processing circuits maintained by the client including, for example, database circuit 101 which may include a database manager such as the above-described type. Similarly, the control directives can be stored locally within the client-specific control engines, or stored remotely (e.g., in a centralized database, in a database maintained by the client or a combination thereof). In certain specific examples, the database manager circuit (or database 101) refers to or includes a relational database management system (RDMS) which stores data securely and returns the data in response to requests from other applications, as implemented by a database management server, and which can temporarily store data in cache 105.

In one specific example, the form of the system shown in FIG. 1A includes the data-communications server 110 configured as a unified-communications and call center (UC-CC) platform that processes incoming data-communication interactions including different types of digitally-represented communications (e.g., text, chat, email, etc.). The platform is integrated with a memory (database) circuit 101 (optionally with cache memory 105 for quick access to high-priority calls or calls requiring relatively significant analysis and processing). The memory circuit includes database having a plurality or a plethora of information sets. Each of the information sets includes user/client-entity contact information and/or experience data corresponding to past incoming data-communication interactions processed by the platform, and with the information sets being populated via an aggregation of organized data based on data collected in previous incoming interactions. The platform regularly accesses the database to assess the incoming interactions and may use past incoming interactions along with information collected via other data sources (e.g., internal to the system such as AI/ML modeled data and/or 3rd party information). By analyzing the incoming interactions and accessing possible associations relative to the information sets in the memory circuit 101; the platform is able to facilitate an automated self-service experience for users by resolving inquiries discerned through the incoming interactions and/or effecting call-decision routing of incoming interactions to call-center agents or specialists.

Such automated self-service experiences provided via the data-communications server 110 of FIG. 1A may be realized by the processing circuitry 106 including various circuits (e.g., servers, software-directed aspects of CPU(s), logic circuitries, etc.) such as having analytics circuitry 102 to analyze an incoming interaction relative to content in the database 101 and/or to AI/ML models (not shown in FIG. 1A), having decision-routing circuitry 103 for deciding whether and/or how an incoming interaction should be routed, and in certain more specific examples or applications also having feedback circuitry 104. In specific embodiments, the data-communications server 110 may use the analytics circuitry 102 to analyze an incoming interaction by capturing and analyzing digital voice data from spoken conversations in connection with incoming interactions such as between agents of a client entity and customers. The spoken conversations may be transcribed from audio to digital voice data by the data-communications server 110, the endpoint device of the agent via a client on the endpoint device, and/or client data-communications server. The transcription of the spoken audio words to digital voice data can occur via a variety of methods. By discerning the contact information and/or other content (e.g., context of call and/or the transcription), the decision-routing circuitry 103 can access the information sets so as to check for associations and, if certain associations relevant to the current (e.g., live) call, the call may be routed as indicated by an associated one of the information sets, by user/client-entity profile settings stored with or linked to the associated one of the information sets, and/or based on a metric indicating sufficient confidence that the routing the call to a specific designation (e.g., to an expert such as a specialist having been training or otherwise having special knowledge regarding topic discerned from the call, or to an agent/manager who is assigned to the topic or incoming interaction), and each such decision may be discerned by accessing and analyzing the information sets.

Further aspects and example (optional) responsibilities of these circuitries 102, 103 and 104 are discussed further below, for example, in connection with related examples such as an example block diagram shown in FIG. 1B, an example application shown in FIG. 1C, and in connection with example manners in which incoming interactions (calls) may flow as in the other example systems disclosed herein.

In various embodiments, the data-communications system can also track a variety of information, parameters and/or metrics related to calls (i.e., incoming interactions) made or received by the agents of a client entity via processing circuitry 106 that is communicatively coupled to the data-communications server 110. The parameters can include information such as average call duration, compliance of call opening and account information, identification of issues and troubleshooting, resolution, professionalism, and other metrics. The parameters can be scored (e.g., percentage or other value scored) to rate the particular agent on each particular call and to form a metric used to assess an agent. In some embodiments, the parameters and/or metrics can be assessed automatically by the system using keywords. In other embodiments and/or in addition, the calls are recorded and can be replayed for a person to score (or update an automatic score) on the metrics. The parameters and/or metrics can be used to determine an outcome of the call. For example, the resolution can be indicative of the outcome. The scores can be reviewed upon recording the calls which can be reviewed by a reviewer. For example, the reviewer can listen to the call recording while a user interface is displayed on a computing device associated with the reviewer. The user interface displayed can illustrate a timeline of the recorded call, which can show timing of the current voice data being played. The timeline can allow the reviewer to navigate within the call by selecting portions of the timeline to change what the reviewer is listening to. Additionally, the agent and the customer can have different waveforms for efficient reviewing. In other embodiments, other types of analysis are used, as further described herein.

In a number of embodiments, a particular client can customize the metrics that are to be tracked such as by the server 110 of FIG. 1A. Such customization can include the type of metrics, values given, and/or particular phrases or statements for complying with the metric (e.g., a specific call opening). For example, the customization can include definitions of performance expectations and scores, as well as performance thresholds for various metrics.

In a number of embodiments, a particular client can customize the metrics that are tracked. Such customization can include the type of metrics, values given, and/or particular phrases or statements for complying with the metric (e.g., a specific call opening). For example, the customization can include definitions of performance expectations and scores, as well as performance thresholds for various metrics.

As previously described, client-specific control engines can be used to facilitate adjustment of a variety of remote services including, for example, data-communication services such as VoIP calls, audio and/or video conferencing, general private branch exchange services, packet switching, chat, and traffic management as well as non-VoIP services including, but not limited to, website hosting, remote data storage, remote computing services, and virtual computing environments. One or more of such services can be provided, for example, by a cloud computing network having one or more servers configurable for a plurality of clients.

As may be appreciated, audio from an incoming interaction (e.g., incoming VoIP and/or video call) can be transcribed to text using a variety of techniques. As an example, an audio file can be generated and provided to speech recognition circuitry, which can be part of the endpoint device, the data-communications server 110, or other external circuitry. The audio file, which includes an acoustic signal received by a microphone of the endpoint, is converted or transcribed to text (e.g., a set of text words) by the speech recognition circuitry. In various embodiments, the speech recognition circuitry can use a voice model and/or database of words for converting or transcribing the audio to text. For example, the speech recognition circuitry can index the words in the audio file to identify words or phrases, such as using an extensible markup langue (XML), structured query language (SGL), mySQL, idx, and other database language. For more general and specific teachings on transcribing audio to test, reference is made to U.S. Publication No. 2009/0276215, filed on Apr. 17, 2007, entitled "Methods and Systems for Correcting Transcribed Audio Files;" U.S. Pat. No. 7,236,932, filed Sep. 12, 2000, entitled "Method of and Apparatus for Improving Productivity of Human Reviewers of Automatically Transcribed Documents by Media Conversion Systems;" and U.S. Pat. No. 6,424,935, filed Jul. 31, 2000, entitled "Two-way Speech Recognition and Dialect System," each of which are fully incorporated by reference for their teachings.

As illustrated in FIG. 1A, the data-communications server 110 interfaces with a plurality of remotely-situated client entities and includes or is otherwise in communication with processing circuitry 106. The processing circuitry 106 can receive digital voice data indicative of transcribed audio conversations between a plurality of agents and customers of a remotely-situated client entity and identify keywords and speech characteristic parameters from the digital voice data. In specific embodiments, the data-communications server 110 captures the digital voice data via a client on the agent side which may be communicating with a web client contact center and a client on the server side (e.g., a provider-side client as a circuit-based module inside the server 110) and provides the digital voice data to the processing circuitry 106. In other embodiments, the agent-side client communicates the digital voice data to the provider-side client. The provider-side client then provides the digital voice data to the analytics circuitry 102 for identification of keywords and/or speech characteristic parameters. The identification can include analyzing the digital voice data for matches to keywords and speech characteristic parameters stored in an archive and/or database 101.

As may be stored in the various information sets of the database 101, keywords and/or speech characteristic parameters can be associated with outcomes, in some embodiments. Example outcomes can include sale, no sale, positive or negative tone/sentiment. A tone or sentiment of the audio conversation can indicate how the call is perceived by the customer. A tone or sentiment can be identified based on the speech characteristic parameters. Example speech characteristic parameters include frequency, velocity, and amplitude of the conversation.

In a number of specific embodiments, the speech characteristic parameters can be compared to one or more thresholds. For example, the processing circuitry 106 via the analytics circuitry 102, using the provider-side database 101, can identify a speech characteristic parameter which is outside of a threshold value (e.g., indicating an issue or potential problem), and which can correspond to or be indicative of a tone or sentiment of the conversation. As a specific example, audio above a particular amplitude and velocity can be indicative of a customer or agent who is upset or otherwise agitated. The thresholds can include generic thresholds (anything above a particular value), thresholds that are specific to geographic regions or types of customers, and/or baseline values of the specific speaker or agent. For example, if the speaker or agent's speech is faster and louder than their baseline, the speech may be indicative of an issue in the conversation. Further, for certain of certain of the endpoint devices identified in the information sets and/or by way of the content of the incoming interactions being associated with certain conditional actions, the server 110 may predict or load the cache in anticipation of such speech and the call may be routed to a manager or other designated handler (e.g. other agent) better prepare to handle the call.

The processing circuitry 106 can provide association of the keywords and/or speech characteristic parameters with outcomes based on the analysis. The associations can be stored in the database 101 and/or provided to a client data-communications server 121 as feedback via the feedback circuitry 104. The feedback can be provided to a manager of the client entity and used for training purposes. Alternatively and/or in addition, the feedback can be provided to the particular agent in real time or near real time, such as while the audio conversation is ongoing. The feedback can include specific phrases to use and/or suggested changes in speech characteristic parameters.

In other embodiments, the feedback is provided to a manager, such as via a report that summarizes a subset of agents for the client entity. The report can include customer interaction feedback using the associations indicating negative and positive outcomes and associated keywords and/or speech characteristic parameters.

In some embodiments, the processing circuitry 106 can identify a speech characteristic parameter outside of a threshold value (i.e., indicates problem) or a keyword that is associated with a (manager) trigger, and in response, automatically bridge a manager of the respective agent into the audio conversation. The processing circuitry 106 and/or the data-communications server 110 can access a database to identify the manager and information for bridging the manager into the audio conversation.

In some examples, the processing circuitry 106 can store the associations in a database as an archive that is accessible and that ties the keywords with dates of the conversations and the speech characteristic parameters of the particular transcribed audio conversations. The archive can be adjusted over time based on additional audio conversations. For example, the processing circuitry 106 can adjust the associations over time based on further analysis of digital voice data and provide the adjustments as feedback. Alternatively and/or in addition, the adjustments can be based on user input, such as an input from an agent or a manager, as further described herein based on a tone/sentiment and/or keywords. In the following discussion, various implementations and applications are disclosed to provide an understanding of the instant disclosure by way of non-limiting example embodiments exemplified by way of VoIP-type data communications which typically involve a data-communication server communicating with an endpoint device, such as a VoIP-enabled endpoint device ("VOIP device") via a broadband network (e.g., Internet, WiFi, cellular) to connect with the data-communication server that is managed by an VOIP provider such as 8×8, Inc. and/or an Internet Service Provider (ISP) such as Yahoo or Google. Through such a server, call routing and other data communications services are managed for the endpoint device.

Users of a data-communications system can use a plurality of communication services to communicate with clients and other professionals and to carry out various tasks. For example, agents of a client entity can use a private network application to generate work products, a cloud-based application to manage service issues, another cloud-based application to manage direct communications such as email and chat messages, and yet another cloud-based application to manage financial matters such as billing and invoicing. In many instances, it can be beneficial for an entity subscribed to or that otherwise uses the data-communications system to analyze audio conversations across the entity (or across many entities) to improve subsequent interactions with the client or professional. For example, as a particular agent of an entity is conversing vocally with a client, the spoken conversation is captured and transcribed from audio to digital voice data (e.g., audio to data). In specific aspects, a data-communications server operated by the data-communications provider can capture and analyze conversations of many (e.g., 10,000 or more) agents, which can be stored in a directory. A client on the agent side can communicate with a web client contact center (e.g., via virtual access via the Internet), and a client on the provider side. In some embodiments, the client on the agent side can transcribe the conversation from audio to the digital voice data. In other embodiments, the client on the agent side can communicate the audio to a data-communications server operated by the entity, which transcribes the audio to digital voice data using processing circuitry in communication therewith. The processing circuitry can form part of the data-communications server or be separate therefrom. As used herein, the digital voice data is indicative of transcribed audio conversations between agents and others (e.g., customers or other external personnel) of remotely-situated client entities.

In specific embodiments, the processing circuitry analyzes the received digital voice data, the digital voice data being from the data communication services provided by the data-communications server. The analysis can include identifying keywords and speech characteristic parameters from the digital voice data, which can be, alone or together, indicative of a tone or a sentiment of a conversation (e.g., is the conversation going well or not). Example speech characteristic parameters can include a frequency, wavelength or velocity, and/or amplitude of the audio. In some embodiments, the speech characteristic parameters can be compared to a baseline of the agent to determine a tone. In other embodiments and/or in addition, speech characteristic parameters of the customer can be compared to thresholds to determine a tone. In a number of embodiments, the threshold can be different for different geographic regions, different types of customers (e.g., age, sex), different industries, among other types of classifications. In addition, particular keywords can be associated with and/or indicate a greater probability of a particular tone, sentiment, and/or outcome. As a particular example, the phrases "I want to speak to a manager" or "What is your name" can be associated with a conversation that is not going well for the agent. In other instances, "What is your name" at a particular frequency can be indicative of a positive outcome (e.g., an agent resolves an issue and the customer would like to commend the agent). Although as may be appreciated by one of ordinary skill in the art, embodiments are not so limited and can include a variety of different associations. Further, in various embodiments, the same keywords or phrases can indicate different tones or outcomes for different types of customers.

The identified keywords and speech characteristics can be associated with outcomes of the transcribed audio conversation. The associations can be provided in an archive stored on a memory circuit and which can be updated over time. In various embodiments, the outcome can be determined based on the keywords and/or metadata in the digital voice data. For example, the processing circuitry can identify the keywords and compare them to previously-identified associations of keywords and outcomes. As a specific example, an entity can initially set-up an archive to include associated words and phrases that indicate a sale has occurred, a subscription is continued, a customer hangs up prior to a sale, etc. Alternatively and/or additionally, the archive can include thresholds for speech characteristics parameters that are indicative of different tones or sentiments. The thresholds can indicate or otherwise be associated with a positive conversation, a negative conversation, and changes in threshold indicating a change from a positive to negative or negative to positive conversation. Such thresholds can adjust over time based on feedback into the system and corrections by agents. For example, prior to storing an outcome as associated with a keyword and/or speech characteristics parameter, the outcome and the association can be provided to the agent and/or to a manager for review and approval. In response to an input verifying the outcome, the association is stored. In response to an input correcting the outcome, the associated is not store or a revised outcome is associated with the speech characteristics parameter and stored.

The analysis of the digital voice data can be used for training purposes. For example, a particular agent is provided feedback after the call on what keywords to avoid and/or strategies for the next call. More specifically, the feedback can include providing the association(s) to the client data-communications server and/or to the endpoint device of the agent. In a number of specific embodiments, the feedback or training can be provided in real time or near-real time during the audio conversation. For example, the agent, via an endpoint device (e.g., a computer or otherwise) can be provided a display or audio that cannot be heard by the customer, that indicates keywords to avoid, keywords to use, and/or directs the user to change their speech pattern (e.g., slow your speech down, take a deep breath). In some specific embodiments, specific keywords, alone or in combination with specific speech characteristic parameters, can cause an auto-trigger for connecting a manager to the audio conversation. For example, another endpoint device that is used by the manager can be bridged to the data communication, such as a VoIP call. The data-communications server can access a database to identify the manager and information for connecting the manager into the audio conversation. In this way, a manager can be bridged into a call without additional action by the agent. In some instances, different customers can have different keywords or speech characteristic parameters that trigger the connection with the manager. These keywords or speech characteristic parameters can be based on previous audio conversations with the customer, identification of a category of customer (e.g., important customer that is ranked 10 on a scale of 1-10), among other analytics.

In various embodiments, the processing circuitry and/or the data-communications server operated by the data-communications provider or a client side server can analyze the associations over a period of time, and generate a report indicating different outcomes and associated keywords and/or speech characteristics parameters. Such reports can be used for training purposes and can also be used to identify different patterns. For example, customers from different geographic regions can interact similarly or differently from one another. As previously described, specific keywords or tones can indicate different outcomes based on geographic regions, markets, type of customer, etc. The data-communications server and/or processing circuitry (which may be optionally integrated with this server) can provide assessment of a quality of calls based on the analysis, and provide feedback to the entity. The feedback can be used for training, which can be provided in real time during the call or after.

In some specific embodiments, the analytics can be provided as a service by the data-communication (e.g., VoIP) provider. For example, the analytics can identify keywords and/or tones/sentiments that result in positive outcomes, and also keywords that provide faster outcomes. Additionally, the metrics used to assess the outcome and/or the quality of the call can adjust over time. The adjustment can be responsive to additional digital voice data, and/or verification or adjustment by the agents or a manager to ensure the determined outcomes are correct. In a more specific example, the feedback can be provided by identifying customer-interaction metrics in the digital voice data. In some embodiments, the associations can be locked and a manager reviews the recommended adjustments (by the agent) and approves or denies the adjustment. The customer-interaction metrics include values or ratings of an interaction of an agent with a customer. For example, the customer-interaction metrics can include different ratings which can be impacted by the use or non-use of specific keywords, phrases and speech characteristic parameters.

The processing circuitry can analyze the data over time and across a plurality of agents. For example, particular agents can be identified for an entity that have customer-interaction metrics outside a threshold value. Such agents, for example, can be provided feedback, as described above, for training purposes. The feedback can include identification of customer-interaction metrics to adjust for potentially better outcomes or specific outcomes (e.g., a sale or customer retention). In some instances, the feedback is provided in real time and/or during the conversation, such as recommended phrases to the say to the customer and/or recommended adjustments in the agent's tone. The customer-interaction metrics can be tracked over time and/or adjusted using digital voice data of additional audio conversation.

Another form of an example data-communications system is shown in FIG. 1B, which bears similar aspects as the system depicted in FIG. 1A. The example system of FIG. 1B also includes a data-communications server 138 configured as a UC-CC platform, which is shown receiving different types which include the types of incoming interactions via one or more network channels at 140 similar to as discussed with FIG. 1A, and also incoming interactions associated with the server 138 engaging in conversational speech and with other data sources at via connections to other circuit-communicative endpoints through a broadband network (e.g., cloud-based). This pathway is shown connecting to external audio/video-communication-enabled equipment such as CPUs, smartphones, robots, etc.

An analytics (CPU) processor circuit 142 and other database/source circuitries 144 are shown being integrated with the server 138 but separated by pathways via one or more broadband connections. The analytics processor circuit 142 may be use as directly corresponding to the analytics circuitry 102 of FIG. 1A, or alternatively the server 138 may have the analytics circuitry internal (not shown in FIG. 1B) and the analytics processor circuit 142 may be used selectively by the server 138 to complement the data and associations of the information sets stored in the analytics circuitry internal to the server 138. The other database/source circuitries 144 permit the server 138 to be connected to other sources of information including, as examples, AI/ML resource services which may be trained via data fed by the server 138, customer systems, 3rd party servers (e.g., Lexis and Westlaw (online research), SalesforceTM, Microsoft Dynamics, and other applications for business, research, etc.

The server 138, as shown with conceptual (not physical separation of) responsibilities at 148A and 148B, processes each of these different types of interactions via an integrated memory (e.g., the database circuit 101 of FIG. 1A) for access to information sets which may have user/client-entity contact information and/or experience data corresponding to past incoming data-communication interactions processed by the UC-CC platform. The server platform receives and initially processes an incoming interaction via channel 140 so that an initial step of analysis may be performed. This initial step of analysis, which again may be performed conceptually on one or both the UC and CC sides, may involve for example, security authorization, gate-way passing and/or handing off the incoming interaction to another module within the server or outside the server for further analysis such as the analytics processor circuit 142.

The vertical dashed line is used to show separation of responsibilities of the server conceptualized via UC side 148A and CC side 148B of the server platform; however, in certain example embodiments of the instant disclosure these UC-side and CC-side responsibilities may be actually implemented via physical/logical integration in various ways including the following specific examples performed by the platform/processing circuit to provide an integrated secure-access environment and being performed as only one or a combination of one or more of the following. First, a high-level security-based firewall circuit for accessing one or more of the circuitries 101, 142 and/or 144 with secondary/tertiary level checks before granting accesses. Second, access to one or more of the circuitries 101, 142 and/or 144 being granted with the access pathway implemented as an internal bussing structure controlled by a database manager internal to the UC-CC platform, so as to control access requests to/from the platform. Third, granting such accesses while prohibiting traversal of any broadband gateway circuit and/or of any security-based firewall circuit. Fourth, granting such accesses so long as data provided from one or more of the circuitries 101, 142 and/or 144 so long as data provided from any one or more of the circuitry or circuitries 101, 142 and/or 144 occurs via a single access-based request-and-receive-data transaction, for example, a "single dip" transaction, involving only one of the circuitries 101, 142 and/or 144. Fifth, a limited number of such access-based request-and-receive-data transactions, for example, a "double dip" involving two transactions to any one of the circuitries and/or involving two transactions to two of the circuitries 101, 142 and/or 144 (or alternatively, a "triple dip" involving three transactions collectively to two or to three of the circuitries 101, 142 and/or 144). Sixth, granting such accesses while prohibiting (or exclusively permitting certain types of) data from being provided over any or one or more particular broadband networks, any or one or more particular gateways, and/or any or one or more particular security-based firewall circuits. Again, two or more these examples may be used in combination, for example, with the sixth example being used with fourth or fifth example.

Next, the incoming interaction may be processed by circuit-based modules which traditionally are more closely associated with only one of the UC and CC sides. For example, as depicted in FIG. 1B at the UC side, activities may involve functionality auto-attendant operations and/or a ring-group/call-queue operations to permit incoming callers to access experts/specialists (e.g., subject matter expert) having special knowledge concerning the nature, purpose or context of the incoming interaction as discerned by the analytics processing of the incoming interaction and/or as indicated by answers from the initiator (e.g., caller) of the incoming transaction to automated subject-based hierarchical queries from the server back to the initiator. The server/processing circuit may route such a particular incoming interaction to a discerned one of various possible selected experts (or specialists) having a high likelihood of being able to address the issue of the incoming transaction. In more specific example embodiments, the server/processing circuit may decide at which point to route the incoming transaction to such an expert or specialist (via real or virtual system extension x1001) based on a confidence level, relative to a fixed or variable threshold, that the discerned issue has been more than likely recognized as matching the knowledge category/categories of the expert or specialist. Moreover, the threshold and/or the manner in which the issue is discerned may be based on the server/processing circuit assessing data from, as examples: information set(s) accessed in the database (e.g., 101 of FIG. 1A); analytics circuitries/modules (such as 102 of FIG. 1A which may or may not include AI/ML algorithms and/or models depending on the specific implementation) whether internal to the data-communications system and/or external via a broadband and gateway to/from the system (e.g., via analytics processor and/or other database/source circuitries 142, 144 of FIG. 1B).

At the CC side, activities may involve interactive voice recognition (IVR) operations to permit incoming callers to access information automatically via a voice response system of prerecorded messages without having to speak to an agent, and/or use menu-driven options to have their calls routed to specific departments or specialists, with or without similar confidence assessment as described above in connection with the server/processing circuit assessing data from the above-noted examples (e.g., via 101 of FIG. 1A and/or 142, 144 of FIG. 1B). As depicted at the bottom of FIG. 1B, the server/processing circuitry may route the incoming transaction to an agent, for example, via real or virtual system-based extension x1002, selected through the system's service-provided IVR experience.

Accordingly, with the example embodiment of the system shown in FIG. 1A, the related system depicted in FIG. 1B is able to facilitate an automated self-service experience for users by resolving inquiries discerned through the incoming interactions and/or effecting call-decision routing of incoming interactions to call-center agents or specialists, and this may be achieved by analyzing the incoming interactions and accessing possible associations relative to the information sets in the database, and/or other sources of information (and optionally, analysis).

The system shown in FIG. 1B may include the user interface circuit 150 operable to respond to supervisory user 151 as in FIG. 1A. An association selected from the network-based data sources 144 may link one or more data communications with endpoint devices, as may involve agent-customer communications with live data as shown, and allow the supervisory user to access the live data communications. The user interface circuit 150 (e.g., in connection with analytics circuitry 142 may generate and present analytics data based on characteristics of the live data communications, and historical characteristics, of data communications involving the selected association. Such historical aspects may, for example, be provided via the network-based data sources 144 and pertain to historical communication streams. A communication engine, including one or more servers, may be implanted with the data-communications server 138 to provide asynchronous (delayed) communications to the agent as shown, including video communication data generated by the supervisory user 151 in response to the analytics data for delayed access by the one or more individuals designated on behalf of the client entity.

In more specific examples and according to other aspects of the present disclosure, the UC-CC platform may process the incoming interactions in various ways and while making use of different resources (e.g., depending on the services linked to the respective incoming interactions and depending on aspects related to the call itself). The following explains some of these more specific examples, each of which is according to aspects of the present disclosure.

In connection with one such example aspect, the UC-CC platform is to read from the database to assess whether a selected one of the incoming interactions has source identification information associated with archived database information for indicating whether the selected one of the incoming interactions is to be routed, terminated or processed according to special instructions, and the UC-CC platform may write to the database to augment the database with information discerned from the inbound communication based on the source identification information and/or content deciphered from the inbound communication.

With regards to other example aspects, the UC-CC platform is to respond to a selected one of the incoming interactions: by iteratively accessing the database to assess for whether the selected one of the incoming interactions has archived associations stored therein and to augment the database with new associations generated in response to analyzing content from the selected one of the incoming interactions; and by, in sequence, assessing from the database whether the selected one of the incoming interactions has archived associations stored therein; assessing whether there is sufficient information in the database for the selected one of the incoming interactions to be routed, terminated or processed according to special instructions. Further, the UC-CC platform is to pursue may pursue at least one additional resource, according to client-specific profile data in the database, in attempt to gain more information for the selected one of the incoming interactions to be routed, terminated or processed specially based on said more information. The additional resource(s) may include a series of queries fed back to the initiator of the selected one of the incoming interactions, and wherein in response to the initiator answering one or more of the series of queries, the UC-CC platform augments the database with new associations generated in response the initiator answering one or more of the series of queries and/or trains AI/ML models to be use in processing subsequent incoming interactions.

In connection with yet further aspects, the UC-CC platform may respond to a selected one of the incoming interactions by performing an analysis on whether source information and/or content data warrants augmenting the database with newly-generated associations, and also may perform the analysis based on one or more confidence thresholds, corresponding to metrics or parameters provided by client entities, which indicate likelihoods that the newly-generated associations have sufficiently-high integrity.

In a more specific example, the UC-CC platform includes a computer-based database manager for managing access (reads, writes, refreshes, cache management, etc.) to the database which may be formed of different regions of memory circuitry and/or different memory circuits. In this context, database manager may act as an interface to various modules (e.g., programmed circuits) in the data-communication system which are to request access to the database for a selected one of the incoming interactions. As an example for use of the database manager in an integrated secure-access environment, the UC-CC platform accesses the database through an access pathway in which the database manager resides to respond to access requests from the UC-CC platform. In more specific examples of this type, the access pathway is situated so that access to the database does not traverse any broadband gateway circuit and does not traverse any security-based firewall circuit, and alternatively for permitting access over the broadband network while limiting exposure to unauthorized accesses, the access pathway is situated so that access to the database does not traverse more than one broadband gateway circuit and does not traverse more than one security-based firewall circuit.

In another related yet more-specific example, the UC-CC platform of one or more of the above data-communications systems accesses information regarding designated call-center agents and specialists which are stored in the database, and then routes the incoming interactions to the agents and/or specialists as may be appropriate given the particular details of the incoming interaction which are discerned by the UC-CC platform. In this regard, the UC-CC platform may also access the archived associations in the database for deciding whether to route respective ones of the incoming interactions to one or more of the designated call-center agents or one or more of the specialists having specific knowledge of subject matter discerned through the incoming interactions.

In certain situations, after a respective one of the incoming interactions is routed to a receiving party, whether one or more agents or one of more specialists or another party, the UC-CC platform may permit the initiating/receiving party of the incoming interaction to select a bridging option for causing a selected party to be bridged and joined into the incoming interaction and this bridging could be to anywhere inside or outside the system or client entity related to the incoming interaction. Further, in response to the selected party being bridged and joined into the current (e.g., live) incoming interaction, the UC-CC platform may archive information to associate the call and the bridging into the database for use in a subsequent one of the incoming interactions. Also, according to another aspect which may optionally be part of the automated self-service experience, the UC-CC platform may access the database for the subsequent one of the incoming interactions and in response to finding corresponding parameters for the incoming interaction, may cause the subsequent one of the incoming interactions to automatically bridge, or offer as an option to bridge, one or more agents and/or one or more specialists into the subsequent one of the incoming interactions.

As other aspects related to the above data-communications systems, the UC-CC platform may access the database for content in a selected one of the incoming interactions which content indicates whether to bridge a manager affiliated with an account, into the selected one of the incoming interactions. The affiliated manager may be identified by source information for the selected one of the incoming interactions and/or by associations stored in the database. Also, the UC-CC platform may bridge to such a manager into the selected one of the incoming interactions in response to discerning one or more of: keywords, context, intonation, and speech characteristics, and the UC-CC platform may discern, in response to the accessing of the database for a selected one of the incoming interactions, whether to offer an entity affiliated with the selected one of the incoming interactions, one or more data-communications services and/or data analytics packages through which the user or affiliated client entity might gain access to metrics, outcomes and certain AI/ML models which are part of or being generated by the system. The database may also include representations of digital voice data associated with transcribed audio conversations which correspond to one or more of the incoming interactions, and may further include geographic information and/or calendar information provided by or associated with the one or more of the incoming interactions, wherein the representations of digital voice data include keywords and speech characteristic parameters associated with outcomes of or with contexts relating to the transcribed audio conversations.

In another example aspect, the UC-CC platform may affect the call-decision routing of the incoming interactions to the above-mentioned designated call-center agents or specialists based on a time-based assessment of whether the designated call-center agents or specialists are able to handle the routing of the incoming interactions. Such assessments of whether the designated call-center agents or specialists are able to handle the routing of the incoming interactions may be performed by predictive analysis, models and related system data.

Depending on the application, it will be appreciated that the UC-CC platform can be implemented to include a cloud-based set of data/call centers, at least one of which includes a plurality of data-communications servers respectively located in different physical locations, and that the UC-CC platform can include physically-separated virtual servers and/or circuit-based modules that are configured to work together so that they collectively function as a single unified server having integrated read and write access to the database without having to pass through a gateway of 3rd party entity (e.g., which is disparately managed relative to the service provider on behalf of the UC-CC platform). Also, such physically-separated virtual servers and/or circuit-based modules of the UC-CC platform may be configured and integrated for access to the database without having to pass through disparately-managed security-screening filters.

In accordance with the present disclosure, FIG. 1C provides a simple example of how an incoming interaction may be processed via a generalized data-flow diagram. The data-flow diagram shows one of many ways for how such an incoming interaction may be received and processed by one or more of the above-disclosed example data-communications systems (e.g., the UC-CC platform of FIG. 1A or FIG. 1B). FIG. 1C shows two processing pathways respectively illustrating what happens through two incoming interactions from the same initiator, in this example, the two incoming interactions being from Carl, a customer who calls in twice. Carl's first call starts at circuit-based block 162 and flows along a pathway including circuit-based blocks: front desk 164, billing 166, support queue 168, agent/specialist 170 and confirmation of (optionally with feedback to database 101 after) call-termination 174. Carl is transferred by the front desk 164 to Joe at billing 166. Billing 166 informs Carl that he really needs to talk to support personnel and hence, Joe at billing 166 transfers Carl into the support queue 170 where Sue answers. Sue is very helpful and resolves Carl's initial challenge involving his first call starting at block 162.

This processing of Carl's call (the first and/or second call) may or may not involve live communications with one or more humans who go by names Joe and Sue, and in the case of a human, Joe and/or Sue may be live agents or experts to which Carl's first and/or second calls may be transferred after discerning a likelihood that his/her assistance is appropriate. For instance, such information may be output as analytics to analytics circuitry 102 in FIG. 1A. The Supervisory user 151 may opt to schedule asynchronous communications for Sue in support, based on analytics pertaining to the noted communications, incoming as shown, Further, based on said one or a combination of two or more of the blocks 164, 166, 169 and 170, the platform (or processing circuit) generates further associations for storage in information sets as discussed in connection with FIG. 1A the data store or database with each such information set being linked, for example, to Carl via contact information for Carl), Carl's call-in device (e.g., CPU or smartphone), a client entity associated with Carl or his call-in device, and/or context discerned in connection with Carl's incoming interaction.

Continuing with this example, four months later, Carl has slept a few times and calls back in not remembering who he talked to but remembering things worked out well last time.

This second call starts at circuit-based block 182 and flows along a pathway including circuit-based blocks front desk 186 (the same or different via a virtual front desk than front desk 164) and support queue 188 (the same or different via a virtual support queue than support queue 168), with block 190 corresponding to confirmation (optionally with feedback to database 101) of call-termination 174. Again, each of these blocks may or may not involve live communications with one or more humans. Accordingly, in this second call, the call from Carl is received by the front desk 186, which is prompted that "hey, the last time Carl called in, he talked to Sue, and our analysis of the call is that it went well". This may occur with access to the (e.g., analyzed via analytics circuitry in FIG. 1A or 1B). So the front desk transfers the call promptly to Sue based on an access via the front desk 186 to relevant data in the data store 160 and possibly with Sue at block 188 again accessing relevant data in the data store 160.

Accordingly, for this second call, Carl's experience and resolution of Carl's challenge is based on one or more accesses to relevant data in the data store 160 (e.g., via the associations in information sets discussed in connection with FIG. 1A in the data store or database 101) by any one or a combination of two or more of the blocks 164, 166, 169 and 170.

FIG. 2 shows yet another example data-communications system with circuit-based modules highlighted to illustrate one way for how a UC-CC platform/server via cloud-based services 230 detailed to show one or more data-communications servers 232 (having provider-side client circuits 246 and processing circuitry 248), provider/client-specific databases 234 (e.g., as being within the database 101 of FIG. 1A), and data analytics packages 236 which may be subscribed to and/or accessed by selected client entities to which the platform provides data communications services.

In connection with the specifically-illustrated example of FIG. 2, endpoint devices 239, 241, 243, 245 connected in a data network 231 are configured to place and receive VoIP telephone calls between other VoIP endpoint devices, and/or between non-VoIP endpoint devices, although embodiments are not limited to VoIP communications systems. Non-VoIP endpoint devices can include, for example, plain old telephone service (POTS) telephones and cellular-capable devices, which might also be VoIP capable (e.g., smart phones with appropriate VoIP software applications). The various endpoint devices 239, 241, 243, 245 are associated with an account 238 of a client, e.g., Client A, and include circuitry that is specially configured to provide calling functions that include interfacing with the appropriate circuitry of the call service provider used by the corresponding endpoint device. In many contexts, a VoIP endpoint device is a VoIP-capable telephone commonly referred to as IP phones. The VoIP endpoint devices 239, 241, 243, 245 can include, but are not limited to, desktop computers, mobile (smart) phones, laptop computers, and tablets, such as illustrated by 240, 242, 244. When each of the endpoint devices originates or receives a call in a telephone network, each can be characterized or referred to as an addressable call endpoint or a dial peer. The client can have or be associated with one or more client databases 237 for storing various data and a client specific control engine 235.

The data (e.g., call) routing and other services for the VoIP telephone calls can be provided by one or more data-communications servers 232 within a UC-CC services system 230 which may be cloud-based as depicted in the example illustration of FIG. 2 (e.g., configured to provide a PaaS to customers of the VoIP provider). In particular example embodiments, the data-communications servers 232 can be located within platform as a service (PaaS) computing servers, which are part of the UC-CC services system 230. The UC-CC services system 230 also includes one or more provider hosted client-specific control engines 235. A client-specific control engine can also be implemented locally by a client (e.g., 246). In some embodiments, data centers can be part of a cloud-based system where the hardware providing the cloud services is located in a number of different data centers with different physical locations. Consistent with embodiments, the cloud services can include session initiation protocol (SIP) servers, media servers, and servers providing other services to both VoIP endpoint devices and the users of the VoIP endpoint devices. In some instances, the various servers, including both the data-communications servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified UC-CC server.

The system shown in FIG. 2 may include a user interface circuit 260 operable to respond to a supervisory user 261, similarly as characterized with FIG. 1A. When the supervisory user selects an association from a database 234 linked to one or more data communications with endpoint devices (e.g., 239), by enabling the supervisory user to access live data communications (e.g., audio and/or video communications) involving the selected association. The user interface circuit 260 (e.g., in connection with analytics circuitry at 236) may generate and present analytics data based on characteristics of the live data communications, and historical characteristics, of data communications involving the selected association. Such historical aspects may, for example, be stored in database 234 and pertain to historical communication streams. A communication engine, including one or more servers, may be implanted with the UC-CC cloud-based services 230 to provide asynchronous (delayed) communications to an agent-side client 253, including video communication data generated by the supervisory user 261.

A particular example of a data-communications server which uses Session Initiation Protocol (SIP) to handle various call functions (e.g., call setup and tear down); however, the various embodiments discussed herein are not necessarily limited thereto. Consistent with the above and other embodiments disclosed herein, the data-communication servers are VoIP communications servers that are configured to establish a leg of the call from the VoIP endpoint devices (or dial peers) to another VoIP endpoint device, or to a gateway.

According to various embodiments, one or more data-communications servers 232 can monitor and analyze call data relating to digital call data of calls occurring using the VoIP endpoint devices 239, 241, 243, 245 via processing circuitry 248. For example, a data-communications server (in the UC-CC platform as with FIG. 1A) can be designed to receive digital voice data, such as directly from an agent-side client associated with particular endpoint devices. The agent-side client can communicate the audio or the digital voice data to the provider-side client. The provider-side client then provides the audio or digital voice data to processing circuitry 248 which may include analytics and decision-routing circuitries (e.g., as shown in FIG. 1A) and in certain more specific examples may include processing/communications circuitry internal and/or external to the data-communications system for further analysis, such as transcribing to digital voice data, identifying keywords and/or speech characteristic parameters, identifying an outcome, and providing an association between the keywords and/or speech characteristic parameter using the identified outcome. The association can be stored in an archive in provider-side and/or client-specific database(s) 234. In some specific embodiments, new keywords and/or parameter values are identified as having an association with an outcome. In other embodiments and/or in addition, a stronger correlation (e.g., probability) between the keywords and/or parameters is provided over time responsive to multiple verifications of an association. For example, a script running the data-communications server 232 can parse call digital call data and stored association to generate database queries that direct the data-communications server to provide a new association and/or update an existing association. The script can use the information to generate a report that can be used for training, promotions, and/or other analysis of agents. According to various embodiments, the database queries can be sent to a customer database 237. The feedback can be provided in real time or near real time to the endpoint device of the agent and/or can be accessed by a manager.

Additionally as another aspect of the present disclosure, in a system implementation a plurality of such UC-CC communications-service platforms (each according to one or more of the above embodiments of the present disclosure) is deployed redundantly across a mixture of private and/or public data clouds and collectively said plurality of platforms enable such UC-CC platforms to switch in real-time or near real-time (effectively instantly for purposes of a system operation from a user's perspective and/or experience) to a redundant platform in the case of any service interruption. This enables services to be provided to end customers seamlessly and/or without interruption. Accordingly, in such a system, UC-CC platforms may act as redundant subsystems with each such platform being deployed across a plurality of data networks and/or clouds to provide redundancy, and with the plurality of data networks and/or clouds being private and/or public and being configured to enable each of the UC-CC platforms to switch to another one of the UC-CC platforms for redundant real-time or near real-time operation in the case of any event indicative of a possible service interruption.

As another of many advantageous points, such UC-CC communications-service platforms according to the present disclosure are readily configurable to self-provision of software updates and integration of various virtual resources, and if used, with automatic updates of associations in the provider-side database (e.g., 101) and automated training of the AI/ML models to handle future incoming interactions with more-intelligent and increasingly improving outcomes of challenges. This is in contrast to certain known on-premise contact-center types of systems in which although characterized as being fully unified, updating the software and ensuring the integration of all systems is functional cannot readily/practicably be done often and therefore may be very challenging and unduly expensive for IT staff to accommodate and more likely prone to error, Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" or "module" (also sometimes "circuit-based module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Various embodiments are implemented in accordance with U.S. patent application Ser. No. 16/288,270, entitled "Analysis of Digital Voice Data in a Data-Communication Server System," filed Feb. 28, 2019, and which is fully incorporated herein by reference for its teachings. Reference may also be made to the teachings and underlying references provided in its underlying provisional application. Embodiments discussed therein are not intended, in any way, to be limiting to the overall technical disclosure, or to any part of the claimed invention unless specifically noted.

Similarly, it will be apparent that a server includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a (VOIP) endpoint device (or endpoint) includes a communication circuit and (computer) processing circuits which are configured to establish (VOIP) communication sessions with other endpoint devices. The communications circuit can be enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, a processing circuit or circuitry, as provided above, is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the

DETAILED DESCRIPTION

The skilled artisan would also recognize various terminology as used in the present disclosure by way of their plain meaning. As examples, the Specification may describe and/or illustrates aspects useful for implementing the examples by way of various materials/circuits that may be illustrated as or using terms such as layers, blocks, modules, device, system, unit, controller, and/or other circuit-type depictions. It would also be appreciated that terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A system for processing data communications in a contact center, the system comprising:

a network-enabled communications circuit configured to route or convey communication data relating to a plurality of endpoint devices associated with contact center agents of a client entity, from among a plurality of client entities, registered to receive data-communications services, wherein the communication data are associated with communications between respective contact center agents and end users, and communications between the respective contact center agents and a supervisory user to oversee actions involving one or more of the data communications;

a user interface circuit configured to, in response to the supervisory user selecting an association linked to one of the data communications, enable the supervisory user to access a live data communication involving the selected association, the live data communication including live audio or video communication; and generate and present analytics data based on characteristics of the live data communication, and historical characteristics, of the one of the data communications involving the selected association; and a communication engine, including one or more servers, configured to provide an asynchronous communication involving an individual designated on behalf of the client entity, the asynchronous communication including video communication data generated in association with the analytics data for delayed access by the individual designated on behalf of the client entity;

wherein the video communication data is for asynchronous presentation, and wherein the system is configured to restrict the video communication data for a period of time from access by the individual designated on behalf of the client entity, wherein the individual is one of the contact center agents, or one of the endpoint devices, linked to the selected association.

2. The system of claim 1, wherein the selected association includes an action item involving one or both of audio feed or a video feed.

3. The system of claim 1, wherein the selected association includes identity data linked to at least one of the contact center agents.

4. The system of claim 1, wherein the selected association includes identity data linked to at least one of the plurality of endpoint devices.

5. The system of claim 1, wherein the live data communication is between one of the contact center agents and one of the end users.

6. The system of claim 1, wherein the live data communication comprises data selected from the group of: audio, video, text, media, images, screenshots, documents, and a combination thereof.

7. The system of claim 1, further including:

analytics circuitry coupled to the communications circuit and configured to identify data insights exhibited by the communications between the respective contact center agents and the end users; and assessment circuitry coupled to the communications circuit and to the analytics circuitry and configured to:

classify the identified data insights relative to categories of data communication conditions pertaining to the communications between the contact center agents and endpoint device users, and generate a recommended data-communication condition based on the classification of the identified data insights, wherein the recommended data-communication condition is included with the asynchronous communication.

8. The system of claim 7, further including a data repository server having training content, wherein the assessment circuitry is configured to include the training content from the data repository server in the recommended data-communication condition.

9. The system of claim 1, further including a data repository server having training content, wherein the communication engine is configured to include the training content from the data repository server with the video communication data generated in association with the analytics data.

10. The system of claim 1, further including a predictive learning circuit configured to:

assess characteristics of the communications between the respective contact center agents and the end users, including associating the communications between the respective contact center agents and the end users with one or more data communication categories based on the assessed characteristics; and generate data insights based on the characteristics of the communications between the respective contact center agents and the end users, wherein the data insights include a recommended action for the associated communications.

11. A system for processing data communications in a contact center, the system comprising:

a network-enabled communications circuit configured to route or convey communication data relating to a plurality of endpoint devices associated with contact center agents of a client entity, from among a plurality of client entities, registered to receive data-communications services, wherein the communication data are associated with communications between respective contact center agents and end users, and communications between the respective contact center agents and a supervisory user to oversee actions involving one or more of the data communications;

a user interface circuit configured to, in response to the supervisory user selecting an association linked to one of the data communications, enable the supervisory user to access a live data communication involving the selected association, the live data communication including live audio or video communication; and generate and present analytics data based on characteristics of the live data communication, and historical characteristics of the one of the data communications involving the selected association; and a communication engine, including one or more servers, configured to provide an asynchronous communication involving an individual designated on behalf of the client entity, the asynchronous communication including video communication data generated in association with the analytics data for delayed access by the individual designated on behalf of the client entity;

wherein the video communication data is for asynchronous presentation, and wherein the system is configured to restrict the video communication data for a period of time from access by the individual designated on behalf of the client entity, the period of time being indicated by data generated in conjunction with the video communication data.

12. The system of claim 11, further including a data repository server having training content, wherein the communication engine is configured to include the training content from the data repository server with the video communication data generated in association with the analytics data.

13. A system for processing data communications in a contact center, the system comprising:

a network-enabled communications circuit configured to route or convey communication data relating to a plurality of endpoint devices associated with contact center agents of a client entity, from among a plurality of client entities, registered to receive data-communications services, wherein the communication data are associated with communications between respective contact center agents and end users, and communications between the respective contact center agents and a supervisory user to oversee actions involving one or more of the data communications;

a user interface circuit configured to, in response to the supervisory user selecting an association linked to one of the data communications, enable the supervisory user to access a live data communication involving the selected association, the live data communication including live audio or video communication; and generate and present analytics data based on characteristics of the live data communication, and historical characteristics of the one of the data communications involving the selected association; and a communication engine, including one or more servers, configured to provide an asynchronous communication, the asynchronous communication including video communication data generated in association with the analytics data for delayed access;

wherein the communication engine is configured to provide the asynchronous communication between the supervisory user and one of the contact center agents by: recording video communication data generated while that supervisory user is accessing the live audio or video communication between the one of the contact center agents and one of the end users, and asynchronously communicating the generated video communication data to the the one of the contact center agents at a later time.

14. A computer-implemented method comprising:

routing or conveying communication data, via a contact center operating through a network-enabled communications circuit, on behalf of a plurality of endpoint devices;

in response to a supervisory user selecting an association linked to one of a plurality of data communications involving a contact center agent, enabling the supervisory user to oversee or review actions involving the one of the data communications and to access a live data communication involving the selected association; and generating and presenting analytics data based on characteristics of the live data communication, and historical characteristics of the one of the data communications involving the selected association; and providing, using one or more servers, an asynchronous communication involving the contact center agent, the asynchronous communication including video communication data generated for delayed access;

wherein the act of providing the asynchronous communication comprises asynchronously providing the video communication data, wherein the video communication data is obtained by recording the video communication data involving the contact center agent, and wherein the recorded video communication data is presented for delayed access by the supervisory user.

15. The method of claim 14, further comprising a data repository server having training content, wherein the computer and communications circuit is configured to include the training content from the data repository server with the video communication data.

16. An apparatus comprising:

a computer and communications circuit configured to:

route or convey communication data relating to a plurality of endpoint devices associated with contact center agents;

provide access to live data communications involving the data communications for the plurality of endpoint devices associated with the contact center agents; and generate and present analytics data based on characteristics of the live data communications, and based on historical characteristics of the routed or conveyed communication data; and one or more servers configured to provide an asynchronous communication involving one or more of the contact center agents, the asynchronous communication including video communication data generated in for delayed access by the one of the contact center agents, and/or one of the endpoint devices;

wherein the video communication data is for asynchronous presentation, and wherein the apparatus is configured to restrict the video communication data for a period of time from access by the one of the contact center agents, and/or the one of the endpoint devices.

17. The apparatus of claim 16, further comprising a data repository server having training content, wherein the computer and communications circuit is configured to include the training content from the data repository server with the video communication data.

18. The system of claim 13, further including a data repository server having training content, wherein the communication engine is configured to include the training content from the data repository server with the video communication data generated in association with the analytics data.

* * * * *